United States Patent [19]

Shimoda et al.

[11] Patent Number: 5,479,358

[45] Date of Patent: Dec. 26, 1995

[54] URBAN ENERGY SYSTEM FOR CONTROLLING AN ENERGY PLANT SUPPLYING ENERGY TO A COMMUNITY

[75] Inventors: Makoto Shimoda, Katsuta; Hiroshi Matsumoto, Ibaraki; Hiroshi Miyadera, Hitachi; Akira Sugano, Katsuta, all of Japan

[73] Assignee: Hitachi, Ltd., Tokyo, Japan

[21] Appl. No.: 232,318

[22] Filed: Apr. 25, 1994

Related U.S. Application Data

[63] Continuation of Ser. No. 760,963, Sep. 17, 1991, abandoned.

[30] Foreign Application Priority Data

Sep. 19, 1990 [JP] Japan .................................... 2-246981

[51] Int. Cl.$^6$ ...................................................... H02J 3/14
[52] U.S. Cl. .............................. 364/492; 307/19; 307/20; 307/126; 60/204
[58] Field of Search .................................... 364/492, 401, 364/402, 420; 307/19, 20, 126; 60/204

[56] References Cited

U.S. PATENT DOCUMENTS

| | | | |
|---|---|---|---|
| 4,075,699 | 2/1978 | Schneider et al. | 364/492 |
| 4,168,491 | 9/1979 | Phillips et al. | 364/492 |
| 4,337,401 | 6/1982 | Olson | 364/492 |
| 4,347,575 | 8/1982 | Gurr et al. | 364/492 |
| 4,612,624 | 9/1986 | Tsuji | 364/493 |
| 4,661,914 | 4/1987 | Mulokey et al. | 364/493 |
| 5,274,571 | 12/1993 | Hesse et al. | 364/492 |

FOREIGN PATENT DOCUMENTS 8802584  4/1988  WIPO ........................... H04B 3/54

OTHER PUBLICATIONS

"Neurocomputing Foundations of Research", Rumelhart et al., 1986 (No Month), pp. 318–362.

Primary Examiner—Ellis B. Ramirez
Assistant Examiner—Thomas Peeso
Attorney, Agent, or Firm—Antonelli, Terry, Stout & Kraus

[57] ABSTRACT

An energy supply system operates to supply heat energies, such as cooling water, steam, heating water, etc. to a community, and the system has a function for predicting a future energy demand of the community and to correct it. In a system having an energy plant to store energy and an energy supply pipeline network for connecting the energy plant to the community, the system includes an energy demand plan making section for predicting an energy demand of the community on the basis of past cases of energy supply and for formulating an energy demand plan with respect to time, and an energy demand variation detecting section for determining a variation of the energy demand from the energy demand plan by using a personnel flow measured value measured by personnel flow measuring apparatuses provided at paths to or positions of the community as a parameter. The variation of the future energy demand of the community is predicted and energy which accomodates the determined variation can be prepared.

19 Claims, 20 Drawing Sheets

F I G. 3
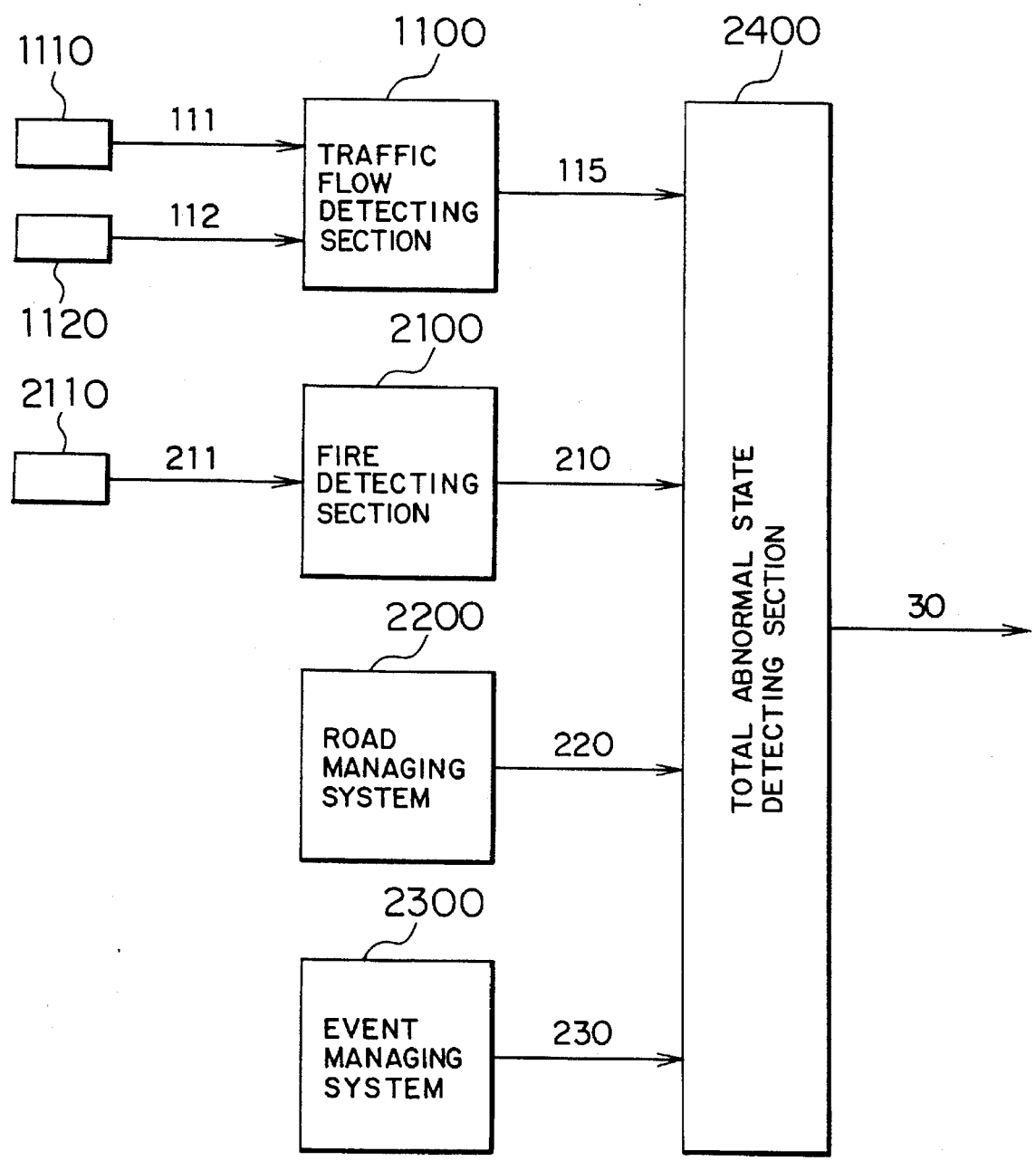

5,479,358

URBAN ENERGY SYSTEM FOR CONTROLLING AN ENERGY PLANT SUPPLYING ENERGY TO A COMMUNITY

This application is a continuation application of Ser. No. 07/760,963, filed Sep. 17, 1991 now abandoned.

BACKGROUND OF THE INVENTION

The present invention relates to an urban energy system and, more particularly, to an energy supplying system which is suitable to supply to a community thermal energy, such as cooling water, steam, or heating water.

As an example of such an energy system, a centralized heating and cooling system and a centralized hot water supplying system for a multiple dwelling house have been disclosed in JP-A-62-155449. According to the above systems, the amount of demand for energy use is determined mainly on the basis of use reservation information obtained from energy users, an amount of energy which can be supplied by the system is predicted using external weather information, and an operation pattern which can satisfy the demand and can optimize the energy use amount is selected.

An automatic control apparatus for a room heating and cooling apparatus has been disclosed in JP-A-61-159043. The automatic control apparatus automatically controls the heating and cooling apparatus to maintain the room temperature at a set temperature when the number of personnel in the room is less than a reference value, and, when the number of personnel in the room is increased to more than the reference value, to change the set temperature in accordance with the increased number of personnel to maintain the changed set temperature.

The invention disclosed in JP-A-62-155449 relates to one multiple dwelling house, whereas the invention disclosed in JP-A-61-159043 relates to one room. Neither of the above inventions relate to a predetermined district, namely, a community in which community activities are carried out.

If the energy demand which is needed by the predetermined district in which such community activities are carried out can be known in advance, energy necessary to satisfy the demand of the district can be stored in an energy plant. Under such circumstances, there would be no need to store more energy than will be needed. From this, in the construction of an energy plant, an energy plant having a proper scale can be constructed according to the energy demand of the community.

Further, if it is expected that a previously predicted energy demand will differ from the actual energy demand and the predicted energy demand can be corrected, the occurrence of a lack of energy supply in the community can be avoided, and a proper countermeasure can be taken to have sufficient power available at all times.

SUMMARY OF THE INVENTION

It is an object of the invention to provide an urban energy system having functions such that the urban energy demand can be predicted in advance and the predicted demand can be corrected.

An example of an urban energy system in accordance with the present invention, having an energy plant for supplying energy for a community and an energy supply pipeline network for connecting the energy plant to the community, characterized by being capable of predicting the energy demand of the community in advance on the basis of past cases, making a demand plan with respect to time, and determining a variation of the energy demand from the demand plan by using as a parameter measured personnel flow values, measured by personnel flow measuring apparatuses which are provided at paths to the community.

It is desirable that the detecting of demand variation include determining the variation of the energy demand, when the personnel flow reaches the community, from the energy demand plan, using as a parameter the measured personnel flow values.

By determining the variation of the energy demand at the time point when the personnel flow reaches the community, from the energy demand plan, the energy which is truly needed by the community can be supplied with good timing, thereby avoiding occurrence of a lack of energy supply.

According to the invention, there is provided an energy supply plan system and an energy supply system which can predict the energy demand of a community not only at a current time point but also in future.

BRIEF DESCRIPTION OF THE DRAWINGS

FIG. 3 is a diagram useful for explaining the abnormal state detecting section 2000 of FIG. 1;

DESCRIPTION OF THE PREFERRED EMBODIMENTS

Figure 23:
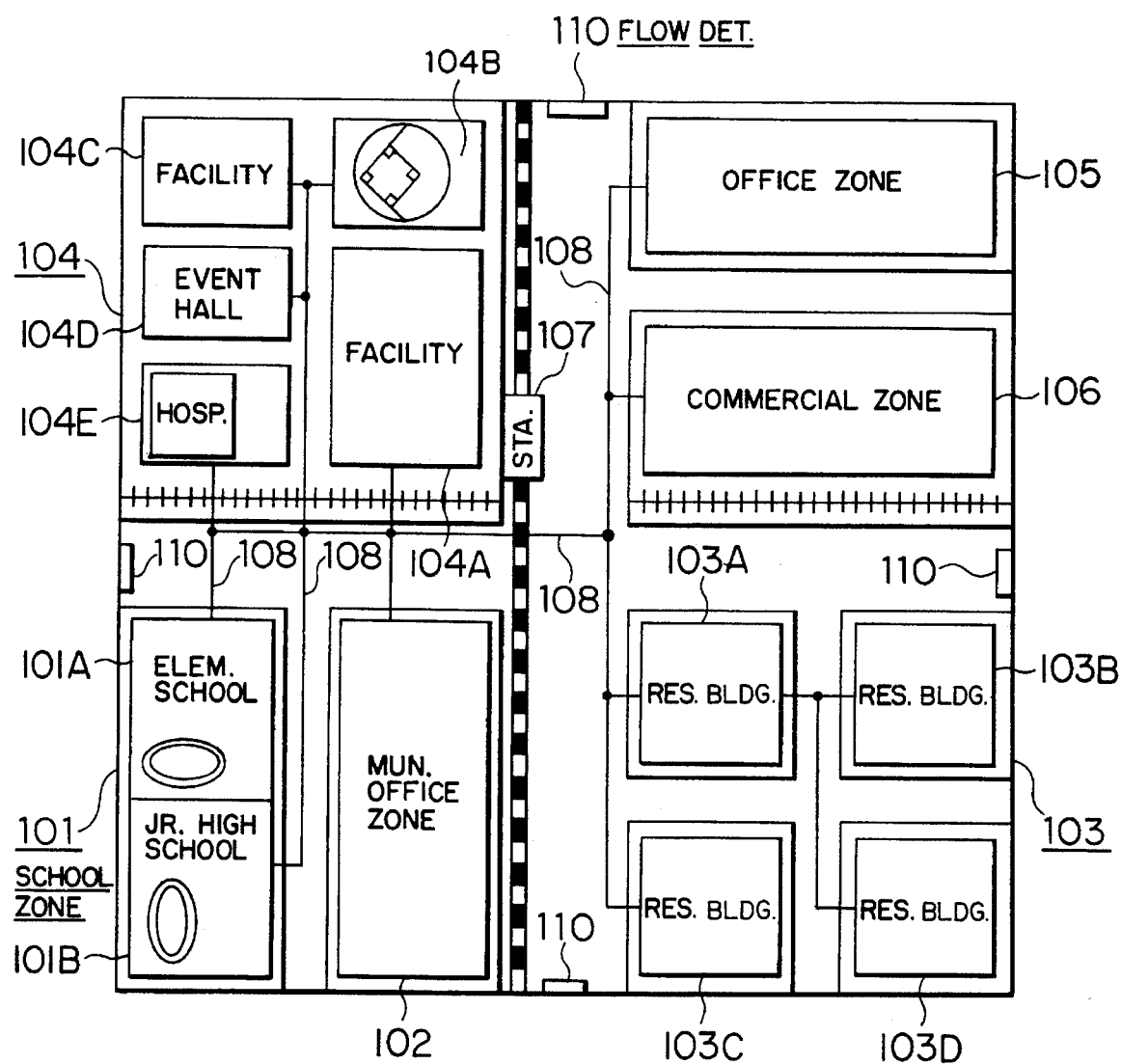
FIG. 23 is a schematic diagram showing an example of a community as one of control objects of the present invention.

FIG. 23 shows an example of a schematic arrangement of a community of a type to which the present invention may be applied, including a road network, and a layout of utility tunnels in which wirings and pipes for electric power, cooling water, steam, heating water, gas, and the like are provided. In the community there is included a school zone 101 containing an elementary school 101A and a junior high school 101B; a government and municipal office zone 102; a residence zone 103 containing residence buildings 103A, 103B, 103C, and 103D; a multiplex zone 104 containing an event hall 104D, a hospital 104E, an athletic facility 104B, and other facilities 104A and 104C; an office zone 105 containing a plurality of office buildings; a commercial zone 106 containing stores, department stores, and the like; and a public station building 107 of a railroad and a subway. A plurality of vehicle flow detecting apparatuses 110 are installed on roads which serve as connecting portions between the adjacent zones. A plurality of personnel flow detecting apparatuses are installed in the public station building 107 to measure personnel flow or passersby who enter and go out of the station building 107. Similarly, a plurality of personnel flow detecting apparatuses are installed in entrance and exit portions of each zone to detect movements of passersby.

An energy plant for supplying energy to the community is installed in the underground of the residence building 103A. The energy from the energy plant is supplied to each zone and each building through utility tunnels 108. A traffic control center, equipped with a monitor computer to which information about the personnel and vehicle flows in main portions of the community is continuously input is provided in the government and municipal office zone 102.

Further, a fire defense office for handling fire information in the community is provided in the government and municipal office zone 102 to handle fire information and indicate a fire situation to the traffic control center. In the traffic control center, the positions where traffic jams will occur due to a fire are predicted on the basis of information of the current traffic situation and the portion in which the fire has occurred. Then, the predicted result is indicated to an operator through a CRT on which countermeasures for minimizing the predicted jams are displayed as guidance information. When the operator employs the counter-measures, so as to minimize the abnormal state of the traffic, such as jams or the like, on the basis of the guidance information, the computer which has executed the above processing transmits operation parameters for traffic signals to control the operation of the traffic lights necessary for the indicated countermeasures. The information in the above case is also transferred to a control computer in an energy center.

A schedule of events in the event hall 104D, such as programs, scheduled times, and the like, has been input to the control computer in advance. Personnel and traffic flows are detected by the personnel and traffic flow detecting apparatuses which have been installed around the event hall, and the detected flows are compared with the predicted personnel and traffic flows for the events, thereby detecting deviations of the detected flows from the predicted flows. Similarly, the amount by which the detected amounts of the traffic flows in the respective zones vary from amounts predicted from past cases is detected and transferred to the control computer.

Regarding weather information about the community, forecast information from the Meteorological Agency is obtained and, further, a function for predicting and presuming weather changes from past examples in the community may be also provided by the control computer.

When calculating values of the current situation for values predicted from conventional cases on the basis of the data mentioned above, the control computer predicts the extent to which the energy needed by the community varies from a previously predicted amount, and corrects the predicted energy amount. For the corrected energy amount, in equipment starting and stopping functions, provided in the control computer, it is determined which equipment should be subsequently started or stopped to obtain the highest efficiency in consideration of the margins and safety ratios of the equipment currently in operation. Operation amounts for performing starting or stopping of the equipment are determined and displayed on a CRT. An operator in the energy plant examines the displayed amount, and if the operator agrees with the displayed amount, the operator inputs a message indicative of his or her assent from a console. For this purpose, it is sufficient for inputting such a message to the computer to perform a touching operation on the CRT screen to select a predetermined response. When there are enough data and the displayed content by the control computer is sufficiently worthy of reliability for the operations up to that time point, a method may be employed wherein the content of the operation which has been currently performed is merely displayed on the CRT after ratification of the operation is obtained.

By installing in the community an energy plant having a control function including the functions as mentioned above, a variation in the energy demand can be accurately predicted in correspondence with changes in the state of the community, and hence the energy amount required for the variation can be produced and supplied without any delay.

Figure 1:
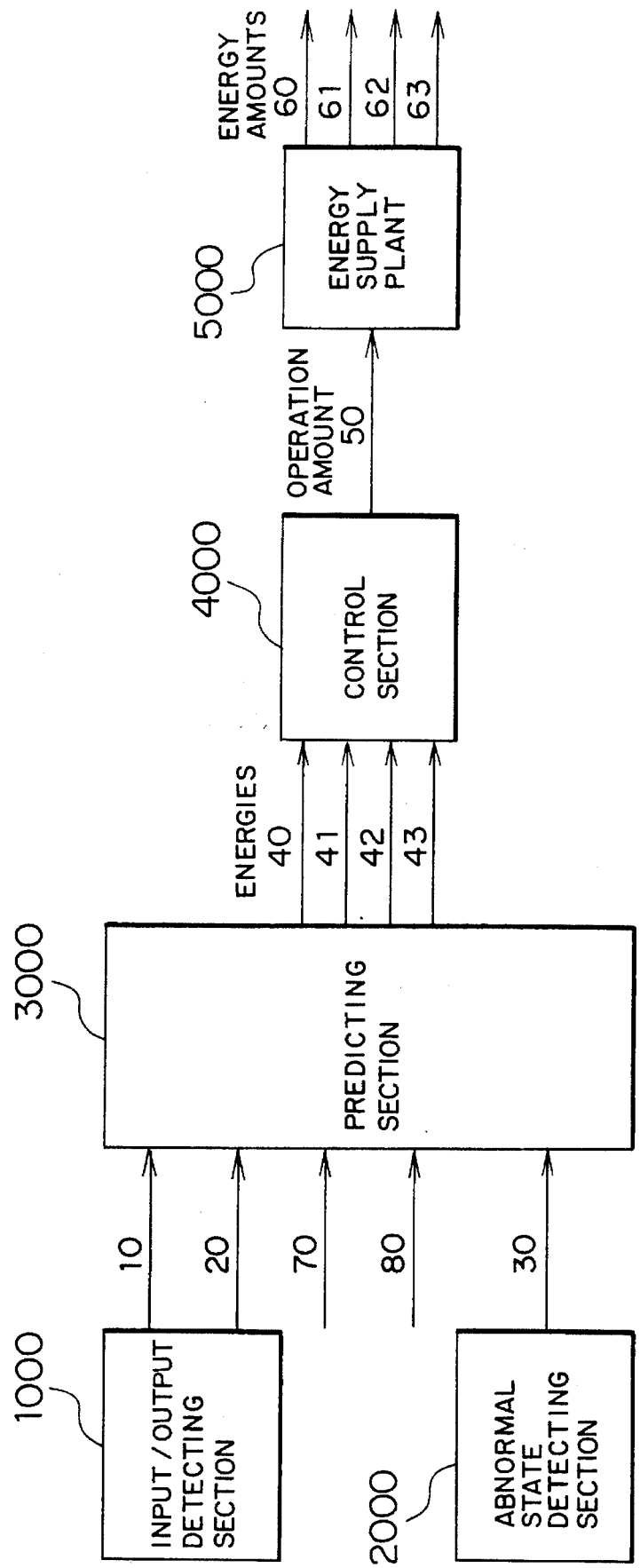
FIG. 1 is a schematic diagram showing functions of an energy supply system for supplying energy to a community according to the present invention.

FIG. 1 shows a fundamental construction of an energy supply system of the present invention. The system comprises input/output detecting section 1000, abnormal state detecting section 2000, predicting section 3000, control section 4000, and an energy plant 5000 as a controlled object.

In an urban community including a plurality of buildings, personnel movements and traffic flows are detected by a plurality of input/output detecting devices, in section 1000, which are installed in the input/output portions of the building and other zones. An abnormal state is quantitatively detected by the abnormal state detecting section 2000 for detecting states of a traffic accident, a traffic jam, a fire, and the like. The detected values are generated as a personnel flow measured value 10, a traffic flow measured value 20, and an abnormal state detected value 30. In the predicting section 3000 for predicting amounts of a plurality of energies 40, 41, 42, and 43 (for instance, electric power, cold water, heating water, and steam) which will be needed in future, on the basis of the detected values by referring to past data, a forecast value 70 of the temperature and the humidity and a deviation 80 of the forecast value from an actual value are also input thereto as input information. In the control section 4000 responsive to these predicted values, an operation amount 50 is outputted for equipment to be started or stopped which are selected from among a plurality of pieces of energy generating equipment, based on energy efficiency, economical performance, and the like, considering safety ratios of the energy generating equipment in the energy plant 5000 and the extent to which the equipment can generate an energy amount satisfying the predicted value. In the energy plant 5000 responsive to the operation amount 50, each piece of equipment is started or stopped, and energy amounts 60, 61, 62, and 63 are produced.

Practical functions and an exemplary construction of the present invention will now be described hereinbelow with reference to FIGS. 2 to 7.

Figure 2:
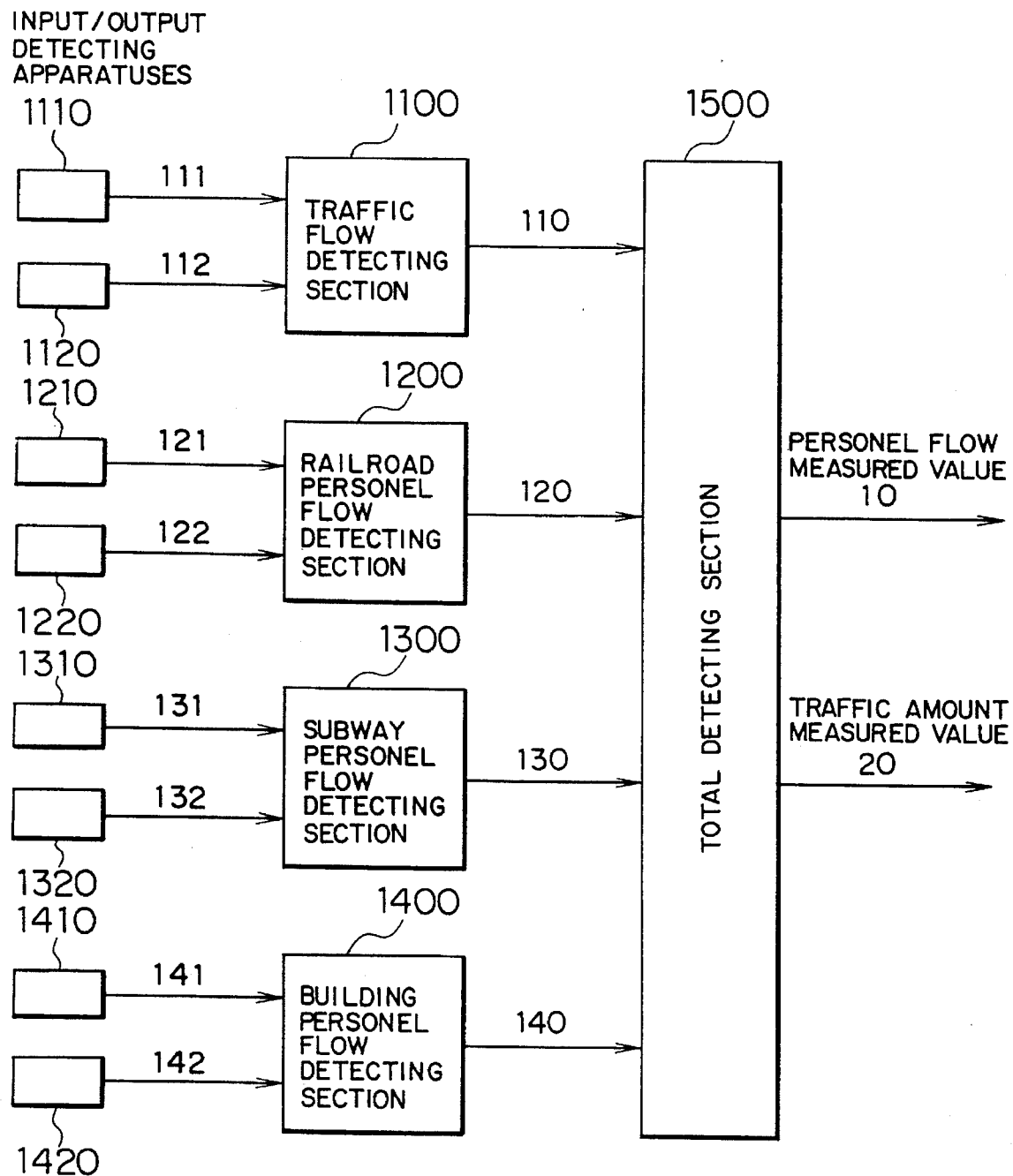
FIG. 2 is a diagram useful for explaining the input/output detecting section 1000 of FIG. 1.

The input/output detecting section 1000 will now be explained with reference to FIG. 2. The input/output detecting section 1000 includes a traffic flow detecting section 1100, a railroad personnel flow detecting section 1200, a subway personnel flow detecting section 1300, a building personnel flow detecting section 1400, a total detecting section 1500, operating on the basis of signals received from a group of input/output detecting apparatuses 1110, 1120, 1210, 1220, 1310, 1320, 1410, and 1420.

An inflow traffic flow signal 111, which is as an output from at least one inflow traffic flow detecting apparatus 1110, and an outflow traffic flow signal 112, which is an output from at least one outflow traffic flow detecting apparatus 1120, are supplied for use in the traffic flow detecting section 1100, and a total amount of traffic for the community as an object is generated as a net or total traffic amount signal 110.

Similarly, an inflow railroad personnel flow signal 121, which is an output from at least one inflow railroad personnel flow detecting apparatus 1210 and an outflow railroad personnel flow signal 122, which is an output from at least one outflow railroad personnel flow detecting apparatus 1220, are supplied for use in the railroad personnel flow detecting section 1200, and a total flow amount of railroad personnel for the community as an object is generated as a total railroad personnel flow signal 120.

Further, an inflow subway personnel flow signal 131, which is an output from at least one inflow subway personnel flow detecting apparatus 1310, and an outflow subway personnel flow signal 132, which is an output from at least one outflow subway personnel flow detecting apparatus 1320, are supplied for use in the subway personnel flow detecting section 1300, and a total flow amount of subway personnel for the community as an object is generated as a total subway personnel flow amount signal 130.

Furthermore, an inflow building personnel flow signal 141, which is an output from at least one inflow building personnel flow detecting apparatus 1410, and an outflow building personnel flow signal 142, which is an output from at least one outflow building personnel flow detecting apparatus 1420, are supplied for use in the building personnel flow detecting section 1400, and a total flow amount of building personnel for the community as an object is generated as a total building personnel flow signal 140.

Then, the total traffic amount signal 110, total railroad personnel flow signal 120, total subway personnel flow amount signal 130, and total building personnel flow signal 140 are supplied for use in the total detecting section 1500 to generate a personnel flow measured value 10 and traffic amount measured value 20 at a certain time.

The abnormal state detecting section 2000 will now be described with reference to FIG. 3. The abnormal state detecting section 2000 includes the traffic flow detecting section 1100, a fire detecting section 2100, a road managing system 2200, an event managing system 2300, a total abnormal state detecting section 2400, operating on the basis of signals received from input/output output detecting apparatuses 1110, 1120, and 2110.

The inflow traffic flow signal 111, which is the output from the inflow traffic flow detecting apparatus 1110, and the outflow traffic flow signal 112, which is the output from the outflow traffic flow detecting apparatus 1120, are supplied for use in the traffic flow detecting section 1100, and a degree of traffic jam in the community as an object is generated as a jam index signal 115.

A fire signal 211, which is an output from the fire detecting apparatus 2110, is supplied for use in the fire detecting section 2100, and a signal indicative of what degree of fire has occurred in which zone in the community is generated from the fire detecting section 2100 as fire information 210.

In the road managing system 2200, opening/closing information for the entrances/exits of the roads, construction information, and the like are managed and road information 220 in the community is generated.

In the event managing system 2300, information regarding increase/decrease in personnel and traffic flows, due to a event or the like which is performed in the community, is managed and outputted as event information 230, such as scales, a degree of personnel flow, necessary times, and the like.

In the total abnormal state detecting section 2400, the jam index signal 115, fire information 210, road information 220, and event information 230 are used to generate an abnormal state detected value 30.

Figure 4:
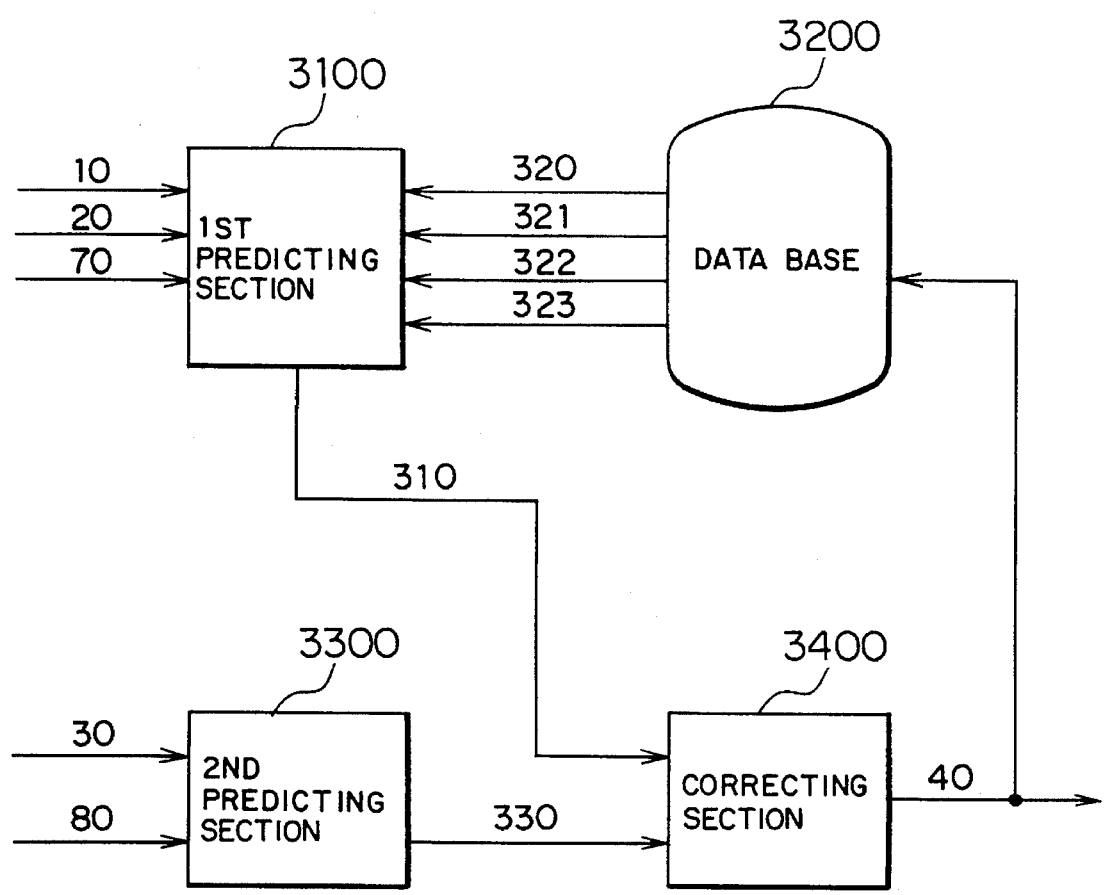
FIG. 4 is a diagram useful for explaining the predicting section 3000 of FIG. 1.

The predicting section 3000 will now be described with reference to FIG. 4. The predicting section 3000 will be explained for the case where plural predicting functions are employed for respective kinds of energy. However, a similar effect can be derived even if a plurality of energy demands are predicted by one prediction function, and so such a case doesn't depart from the scope of the present invention. The predicting section 3000 includes a first predicting section 3100, a second predicting section 3300, a data base 3200, and a correcting section 3400. The first predicting section 3100 receives the personnel flow measured value 10, the traffic amount measured value 20, and the forecast values 70 for temperature and humidity. It also receives a season and a day of the week indication 320, a demand pattern 321 for yesterday, and weather information 322 for yesterday. Information 323 regarding a demand pattern for the current day representative of the season and the weather of a standard day are provided as outputs from the data base 3200. Then, the first predicting section 3100 generates a predicted energy pattern 310 for tomorrow. As this predicting method, it is possible to use a prediction based on past cases, for instance, a multivariate analysis or regression analysis based on past data, a prediction using learning results by a neural network model, or knowledge processing such as Fuzzy reasoning using knowledge of skilled operators, designers, or the like.

In the second predicting section 3300, by inputting the abnormal state detected value 30 and the deviation 80 of the predicted value from the actual value, a variation of the predicted energy amount is determined to generate a second predicted value 330. In the correcting section 3400, the predicted energy pattern 310 and the second predicted value 330 are received, corrected by Fuzzy reasoning using membership functions generated on the basis of past cases, and outputted as a corrected energy pattern 40. The corrected energy pattern 40 is used as a demand pattern for tomorrow for scheduling start or stop operations of equipment on a day unit basis. In the data base 3200, the corrected energy pattern 40 as an output from the correcting section 3400, the personnel flow measured value 10, the traffic flow measured value 20, the forecast value 70 of the temperature and humidity, the abnormal state detected value 30, the deviation 80 of the predicted value from the actual value, and the weather information value are stored as a set. By learning those values as inputs and outputs using a neural network model, a demand for a specific plant can be efficiently predicted. The learning function will be explained in more detail hereinlater.

The manner in which the corrected energy pattern 40 is generated has been described with reference to FIG. 4. The corrected energy patterns 41–43, as seen in FIG. 1, are generated in a similar way.

Figure 5:
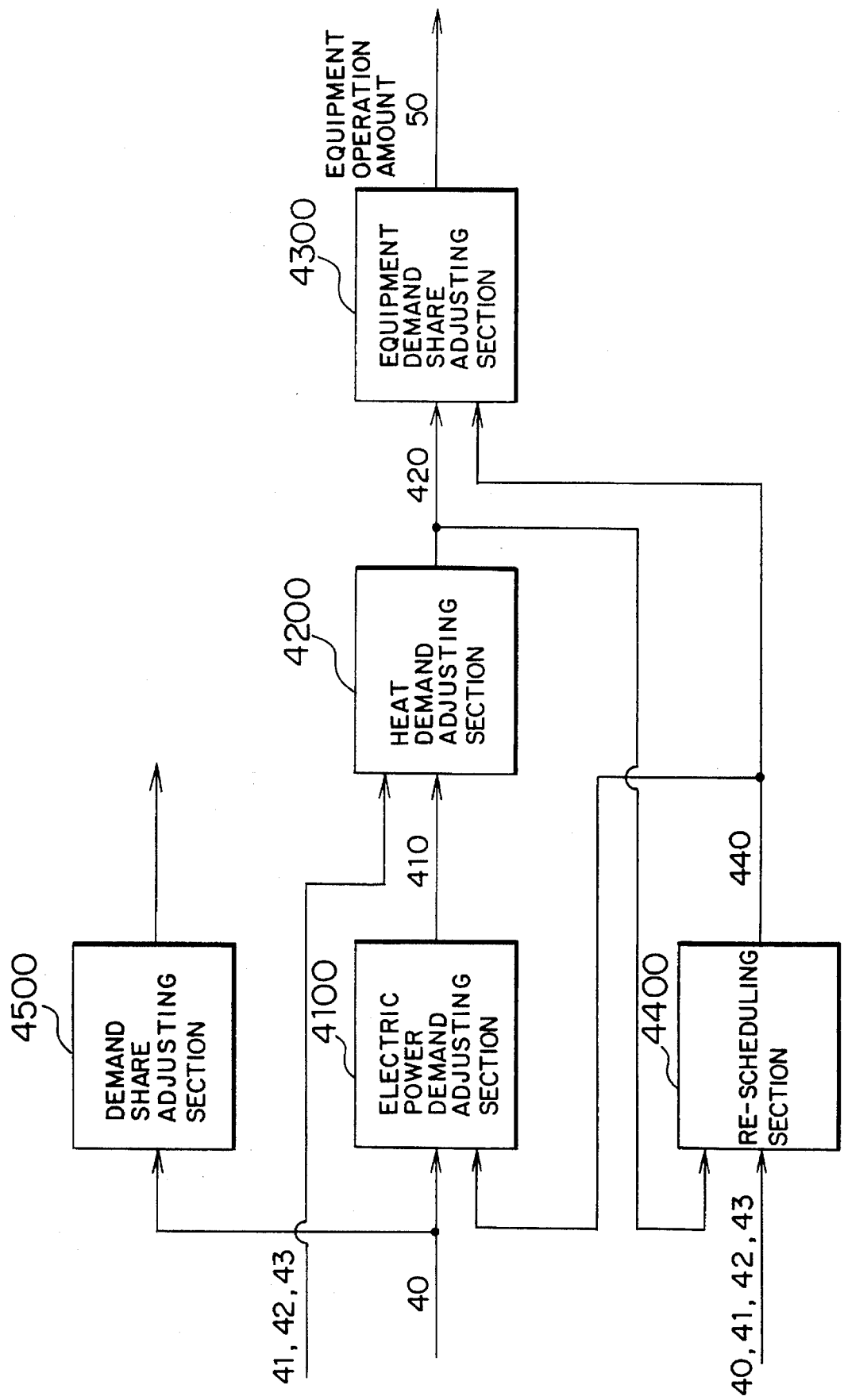
FIG. 5 is a diagram useful for explaining the control section 4000 of FIG. 1.

The control section 4000 will now be described with reference to FIG. 5. The control section 4000 includes an electric power demand adjusting section 4100, a heat demand adjusting section 4200, an equipment demand share adjusting section 4300, a re-scheduling section 4400, and a demand share adjusting section 4500.

The electric power demand adjusting section 4100 receives the corrected energy pattern 40 and a supply margin index 440, which is an output from the re-scheduling section 4400, and generates an electric power supplying demand characteristic 410 for equipment which satisfies an electric power amount for which the maximum value of the corrected energy pattern 40 is taken into account, in addition to the necessary safety ratios. The heat demand adjusting section 4200 receives corrected energy patterns 41, 42, and 43 regarding the heat, as well as the electric power supplying demand characteristic 410, determines an equipment construction which satisfies a heat demand of the corrected energy pattern 40 in consideration of the heat demand which can be supplied from the electric power supplying demand characteristic 410, and generates an energy supplying equipment specification 420. The demand share adjusting section 4300 receives the energy supplying equipment specification 420 and the supply margin index 440, sets an equipment starting schedule for equipment selected from among equipment of the energy supplying equipment specification 420 so as to satisfy the given corrected energy patterns 40, 41, 42, and 43, the schedule satisfying the demand pattern of one day and minimizing the operation costs including the starting and stopping operations, and generates an equipment operation amount 50.

The re-scheduling section 4400 receives the corrected energy patterns 40, 41, 42, and 43 and the energy supplying equipment specification 420, determines the margin of the equipment construction by checking whether the demand can be satisfied by the energy supplying equipment specification 420 or not, and compares and examines the characteristic values of the equipment in the case where the energy demand has been changed from the predicted energy pattern 310 to the corrected energy pattern 40. Then, the re-scheduling section 4400 generates the margin as a supply allowance index 440. Further, the demand share adjusting section 4500 receives the corrected energy pattern 40 as the energy demand predicted by the predicting section 3000 and generates, as demand adjusting operation amounts, the operation amount for vanes, valves, dampers, and the like, for determining a distribution ratio for the plurality of types of energy produced by the energy plant 5000 to those demanding energy in the community. The corrected energy pattern 40, the second demand predicted value 330, and the equipment operation amount 50, which are indicative of the input and output at this time, are stored as past cases into a storing function (not shown in the diagrams) for use as a data base of the past cases, for example. By using the learning function of the neural network model, the characteristics of the system can be automatically taken into consideration and the system can grow.

Figure 6:
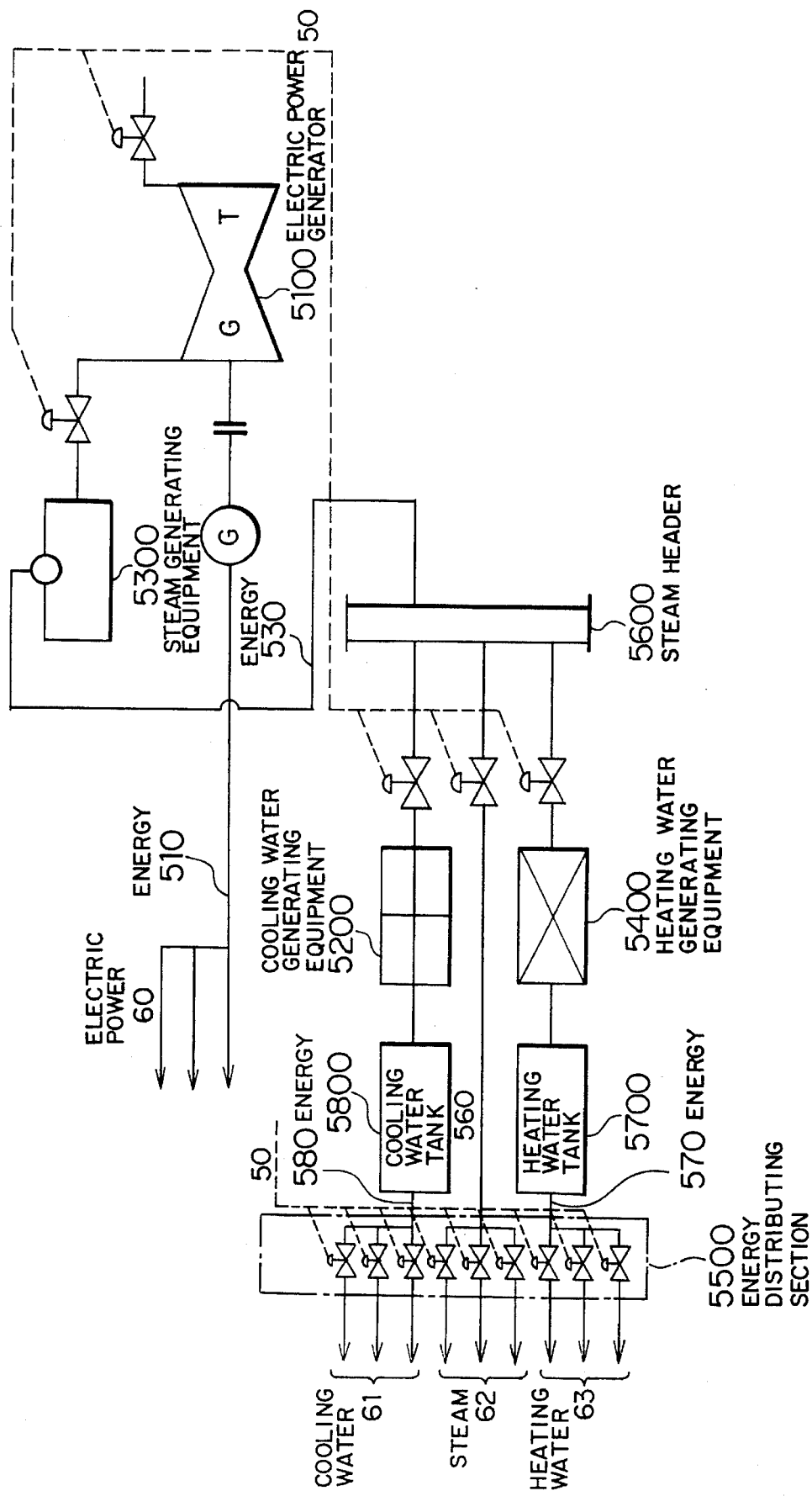
FIG. 6 s a diagram useful for explaining the energy plant 5000 of FIG. 1.

The energy plant 5000 will now be described on the basis of an example of a construction of a plant with reference to FIG. 6. The energy plant 5000 is mainly formed by an electric power generator (a gas turbine here) 5100, a cooling water generator (a gas absorption-type refrigerator here) 5200, a steam generator (a waste heat recovery-type boiler here) 5300, a heating water generator (absorption-type cooling water and heating water generator here) 5400, an energy distributor 5500, a steam header 5600, a cooling water tank 5800, and a heating water tank 5700, which comprise the energy generating equipment necessary for the whole plant. The electric power generator 5100, cooling water generator 5200, steam generator 5300, and heating water generator 5400 receive the equipment operation amount 50 and supply electric power 60, cooling water 61, steam 62, and heating water 63. A demand share adjusting amount denotes an operation amount for designating an output which is shared by equipment to be started or equipment already in the operating state. In the case of a gas turbine, it denotes a gas amount to be injected. In the case of a gas absorption-type refrigerator, it denotes a supply amount of exhaust gas generated from the gas turbine and boiler. In the case of a waste heat recovery-type boiler, it denotes an exhaust gas amount which is allowed to pass through the boiler. In the case of absorption-type cooling water and heating water generator, it denotes opening degrees of valves and dampers for adjusting a steam amount or a cooling water amount which is allowed to pass through the heat exchanger of the equipment. The energy distributor 5500 is mainly constructed of valves and dampers and receives the equipment operation amount 50 and various energy values 510, 570, and 580 and supplies certain energy amounts, i.e. electric power 60, cooling water 61, steam 62, and heating water 63, which are needed by those demanding energy in the community in a corresponding time frame of the corrected energy pattern 40.

Figure 7:
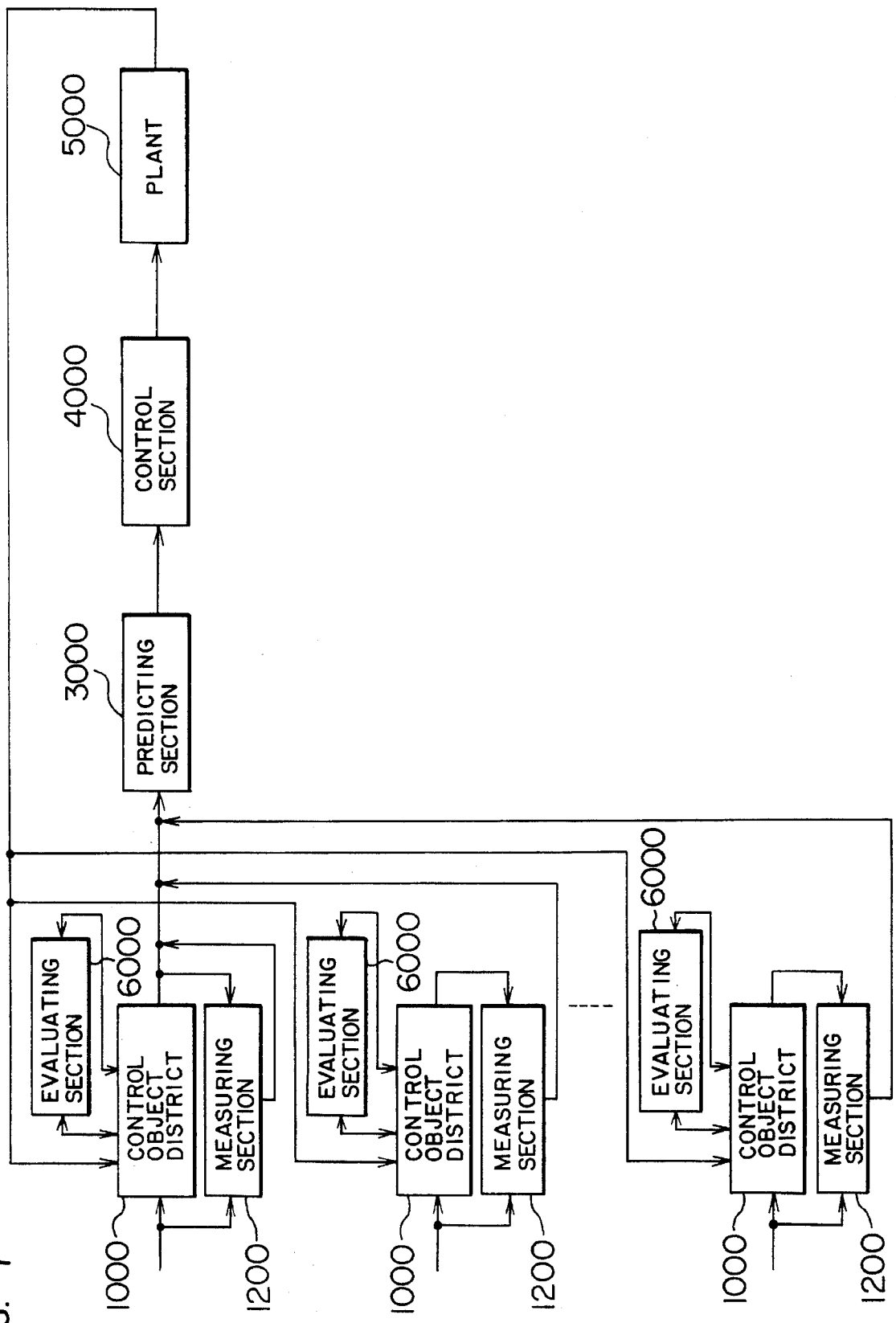
FIG. 7 a constructional diagram of a multiple system including a number of systems each of which is shown in FIG. 1.

In the above example, one input/output detecting section has been provided for every plant. However, even in the case of a plurality of input/output detecting sections as shown in FIG. 7, the purpose of the present invention is not changed. Although it is desirable to distribute the control functions, whether the control functions are embodied in one computer or in a set of computers in a time sharing manner, its purpose is similar to that of the present invention.

Figure 8:
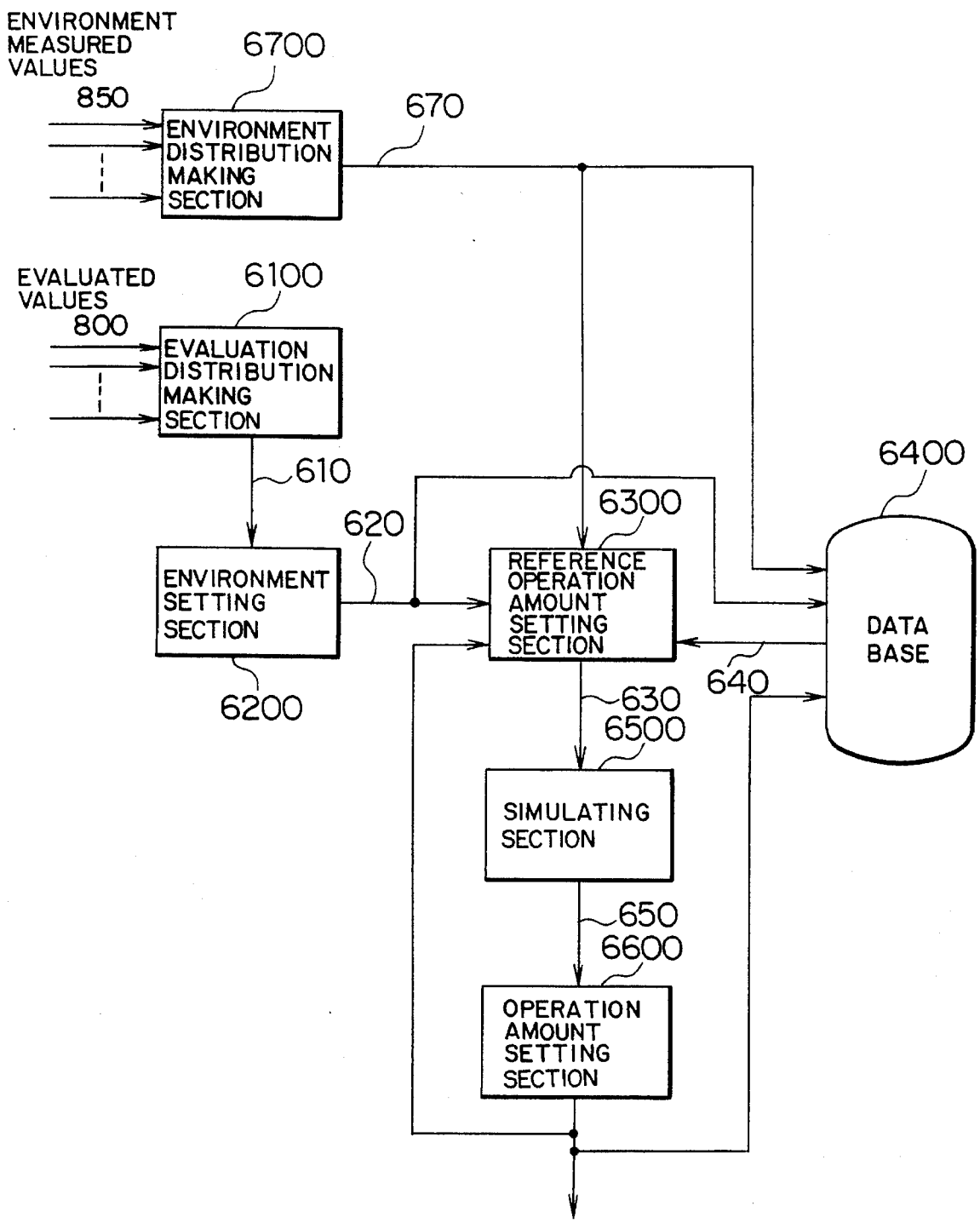
FIG. 8 is a constructional diagram for providing an evaluating function.

The evaluating function will now be described on the basis of FIG. 8. An evaluation distribution making section 6100 receives evaluated values 800 outputted from those demanding energy in the community, generates a distribution of the evaluated values for every demand, and outputs the evaluated value distribution 610. An environment setting section 6200 receives the evaluated value distribution 610, infers by Fuzzy reasoning a target evaluated value distribution, based on persons who dwell in the community, and generates an environment target value 620. An environment distribution making section 6700 receives environment measured values 850 from those demanding energy in the community, generates a distribution of environment measured values for each demand, and outputs an environment measured value distribution 670. A data base 6400 stores the environment target value 620, environment measured value distribution 670, and the optimum operation amounts under these data as pairs. Thus, if the environment target value 620 and the environment measured value distribution 670 are given, an operation amount which is closest to both of them is outputted as a reference operation amount 640 to a reference operation amount setting function 6300 by reasoning based on use of IF THEN rules, a retrieval using a neural network model or the like. However, in the case where past data and actual data do not exist, design values are used as past data and the actual data is collected by continuing the operations. If each design value and an actual value are different, the design value can be updated by substituting the actual value for the design value.

The reference operation amount setting section 6300 receives the environment target value 620, environment measured value distribution 670, and reference operation amount 640 derived by retrieving the data base 6400, and compares the environment target value and the environment measured value distribution when the reference operation amount 640 is given with those values. Thus, if the difference between them is smaller than a set value, the reference operation amount is generated as a set operation amount which satisfies the environment target value 620. If the difference between the environment target value and the environment measured value distribution when the reference operation amount 640 is given is larger than the set value, the reference operation amount 640 is slightly changed to generate the resultant amount as a temporary operation amount 630.

A simulating section 6500 receives the temporary operation amount 630. How much the environment measured value distribution due to those demands changes when the temporary operation amount 630 and a corresponding energy have been given, is simulated by a physical model using a material balance, an interpolation between the actual past data using Fuzzy reasoning, or the like. The resultant simulated value is generated as a set environment measured distribution 650. Then, an operation amount setting section 6600 compares the set environment measured value distribution 650 with the cases in the data base 6400 and performs an interprolation, thereby obtaining a new evaluation distribution.

Subsequently, by comparing the obtained evaluation distribution with the target evaluation distribution 620, a check is made to see if the temporary operation amount 630 is used or not. If the difference between them is smaller than a target difference, the temporary operation amount 630 is generated as a set operation amount. If the difference is larger, the processing routine returns to the reference operation amount measuring section 6300, and similar operations are repeated, thereby searching for an operation amount for which the difference is equal to or less than the set value. In the above case, the set operation amount which is generated is stored as a new case into the data base 6400 so as to form pairs together with the target evaluation distribution 620 and the set evaluation distribution 650.

A learning method using a neural network model which is used in the predicting function 3000, control function 4000, evaluating function, and the like will now be described.

Figure 9:
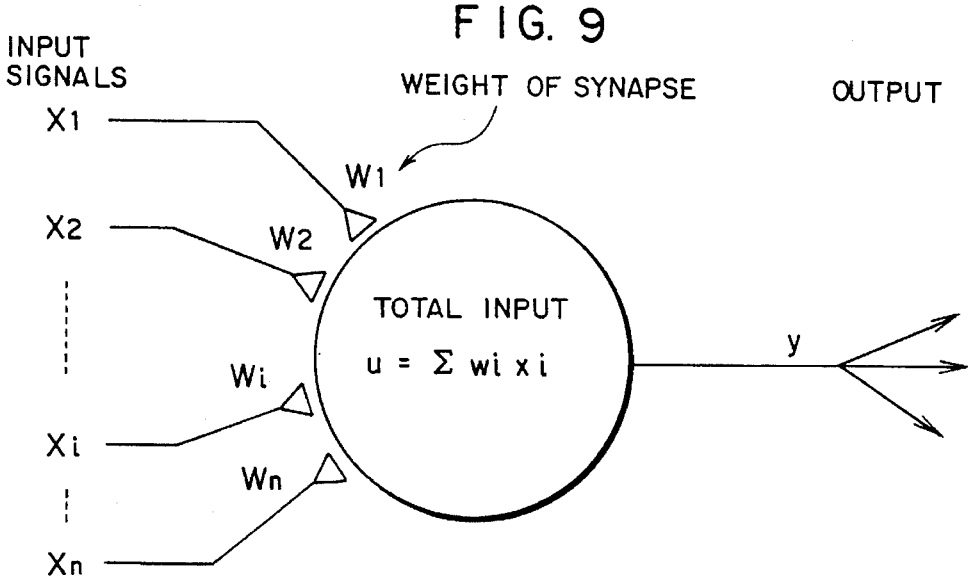
FIG. 9 is a single neuron model of a neural network model as an embodiment of the present invention.

FIG. 9 shows one form of a neural network model. It is now assumed that input signals $X_1, X_2, \ldots, X_n$ to the unit have a value range (0, 1) and that weights of its synapses $W_1, W_2, \ldots, W_n$ have a value range $(-\infty, +\infty)$. Assume that an input $u_i$, which is transferred from the ith input $X_i$ to the unit, is expressed by the following equation (1):

$$u_i = W_i X_i \quad (1)$$

A total input U to the unit is expressed by the following equation (2):

$$U = \sum_{i=1}^{n} u_i \quad (2)$$

A unit output y is defined by the following equation (3):

$$y = \frac{1}{1 + e^{-U+U_0}} \quad (3)$$

Figure 10:
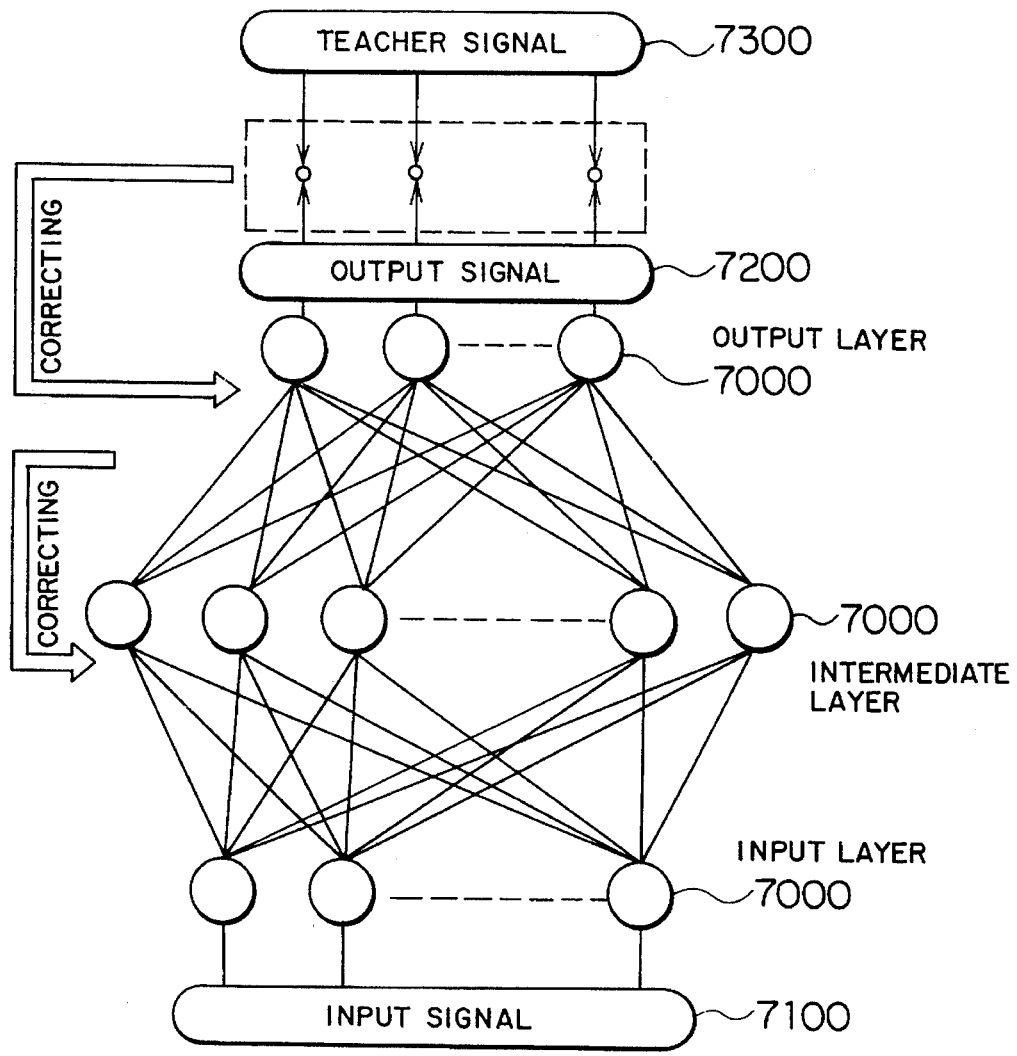
FIG. 10 is a network diagram for explaining a neural network model in which a number of layers of neuron models of FIG. 9 are arranged and a fundamental idea of the learning.

In the equation (3), $U_0$ denotes a bias. In the embodiment, unit models 7000 mentioned above are arranged like layers as shown in FIG. 10. An output signal from each unit 7000 is supplied, as an input signal, to units 7000 of the next layer. The above structure is used as a neural network model. Structures of the above unit model 7000 and neural network model have been described in detail in "Neurocomputing Foundations of Research", the MIT Press., pp 318–362, 1988. According to the above thesis, as shown in FIG. 10, there is a learning algorithm (referred to as a back propagation) in which strengths of connections of the input sections to each unit of an intermediate layer, i.e, weights of synapses, are corrected in accordance with the difference between an input signal pattern 7100 and an output signal pattern 7200 in such a manner that when the input signal pattern 7100 has been given to the input layer, the output signal pattern 7200 is set to a desired signal pattern, namely, a teacher signal pattern 7300. Even in the learning function of the present embodiment, the learning algorithm itself uses the back propagation disclosed in the above thesis.

Figure 11:
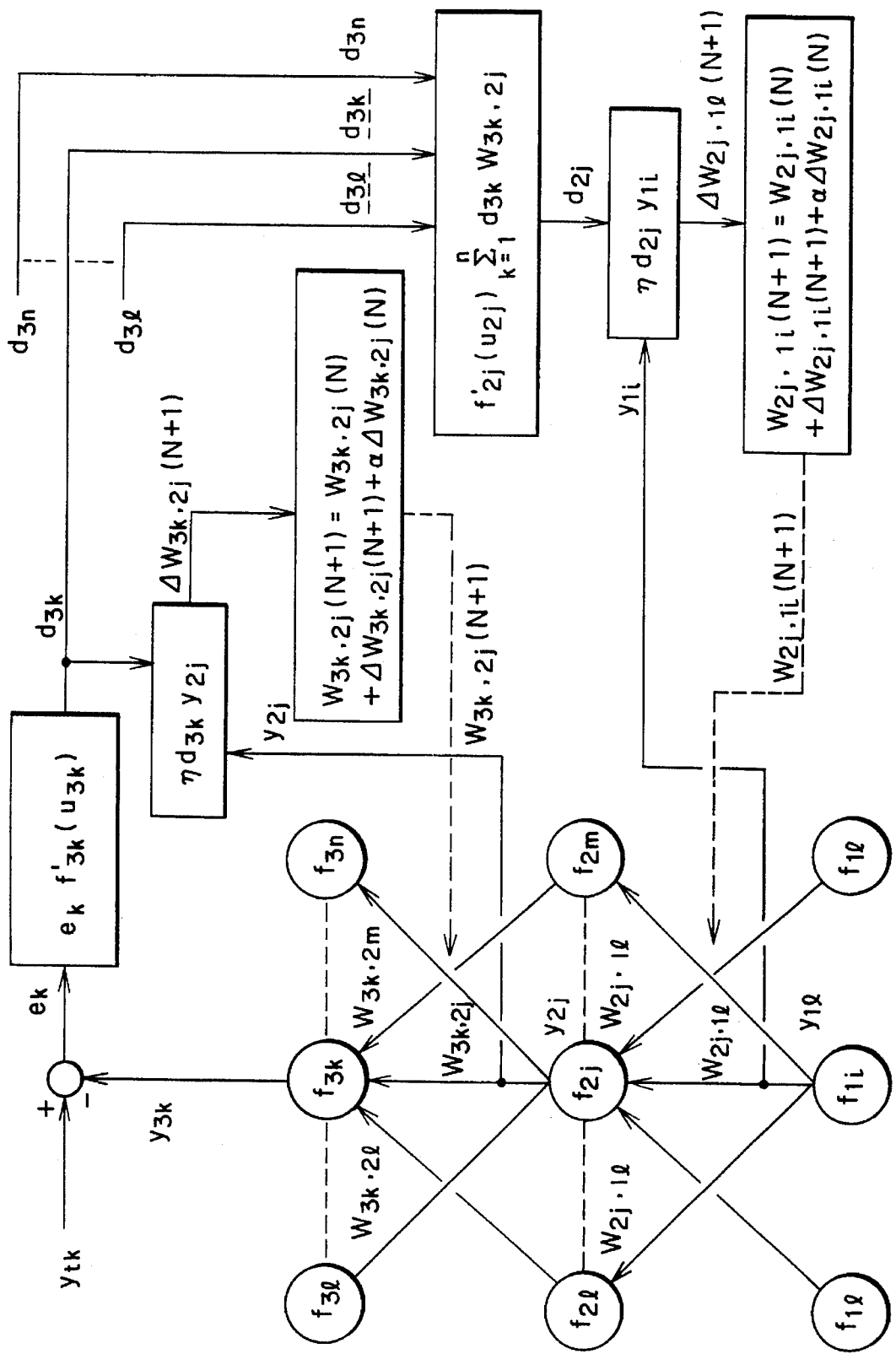
FIG. 11 is a learning algorithm of the neural network model.

FIG. 11 explains an algorithm of the back propagation type. In the diagram, to enable the algorithm to be easily understood, attention is paid to a kth output signal $Y_{3k}$ of the output layer, and there is shown a correcting procedure of the weight of synapse for making the kth output signal coincide with a teacher signal $Y_{tk}$. Now the algorithm shown in FIG. 11 will be explained hereinbelow. First, an error ek between the kth output signal $Y_{3k}$ and the teacher signal $Y_{tk}$ is determined by the following equation (4):

$$ek = Y_{tk} - Y_{3k} \quad (4)$$

Assuming that the degree of influence of the error at an operating level $U_{3k}$ of the unit is $d_{3k}$, $d_{3k}$ is expressed by the following equation (5), where f'(U) is shown by the following equation (6):

$$d_{3k} = e_k f'_{3k}(U_{3k}) \quad (5)$$

$$f'(U) = \frac{df}{dU} = \frac{d}{dU} \frac{1}{1+e^{-U+U_0}} \quad (6)$$

Therefore, a correction amount $\Delta W_{3k,\,2j}(N+1)$ of ga weight $W_{3k,\,2j}$ of a synapse existing in the jth input portion in the kth unit of the output layer is expressed by the following equation:

$$\Delta W_{3k,\,2j}(N+1) = \eta \cdot d_{3k} \cdot y_{2j} \quad (7)$$

where, N: symbol indicative of a preceding learning cycle

η: learning constant $Y_{2j}$: the jth output signal of an intermediate layer

To provide a stable convergence, the correction amount derived by the equation (7) is not directly used but is corrected and a new synapse weight $W_{3k, 2j}(N+1)$ is obtained by the following equation:

$$W_{3k, 2j}(N+1) = W_{3k, 2j}(N) + \Delta W_{3k, 2j}(N+1) + \alpha \cdot W_{3k, 2j}(N) \quad (8)$$

where, α: smoothing constant

The correcting method of the synapse weight in the input portion of the output layer has been shown above.

A method for correcting the synapse weight of the input portion of an intermediate layer will now be explained. In FIG. 11, attention is paid to a weight $W_{2j, 1i}$ of a synapse existing in the ith input portion of the jth unit of the intermediate, and its correcting method is shown. A degree $d_{2j}$ of influence of the error at an operating level $U_{2j}$ of the unit in the above case should be determined based on errors of all of the unit outputs of the output layers and is expressed by the following equation (9):

$$d_{2j} = f'_{2j}(U_{2j}) \sum_{i=1}^{n} d_{3k} \times W_{3k,2j} \quad (9)$$

Therefore, a correction amount $W_{2j, 1i}(N+1)$ of the weight of synapse existing in the ith input portion of the jth unit of the intermediate layer is expressed by the following equation (10):

$$\Delta W_{2j, 1i}(N+1) = \eta \cdot d_{3j} \cdot Y_{1i} \quad (10)$$

where, N: symbol indicative of a preceding learning cycle

η: learning constant $Y_{1i}$: the ith output signal of the input layer

In a similar manner to the case of the output layer, to provide a stable convergence, the correction amount obtained by equation (10) is not directly used, but is corrected, and a new synapse weight $W_{2j, 1i}(N+1)$ is obtained by the following equation:

$$W_{2j, 1i}(N+1) = W_{2j, 1i}(N) + \Delta W_{2j, 1i}(N+1) + \alpha \cdot W_{2j, 1i}(N) \quad (11)$$

where, α: smoothing constant

The error ek can be minimized by repeating the operation processings of the above equations (4) to (11). That is, the output signal pattern from the output layer can be made to coincide with the teacher signal pattern. Thus, the input signal pattern is stored (learned) as a synapse weight distribution (that is, a distribution of strengths of connections in the circuit) in the neural network model. Further, if another input signal pattern is introduced in the input layer, and another pattern is also introduced as a teacher signal pattern in correspondence to it, the above algorithm operates and is stored as a new synapse weight distribution. By using such an algorithm, a plurality of learning samples can be stored in the same neural network model. If the neural network model is used after completion of the learning, when the same pattern as the pattern which has already been learned is input, the same pattern as the output signal pattern used upon learning is generated from the output layer. On the other hand, even if a pattern which is not yet learned is input, a pattern similar to the output signal pattern is obtained in accordance with the certainty with the pattern which has already been learned.

Figure 12:
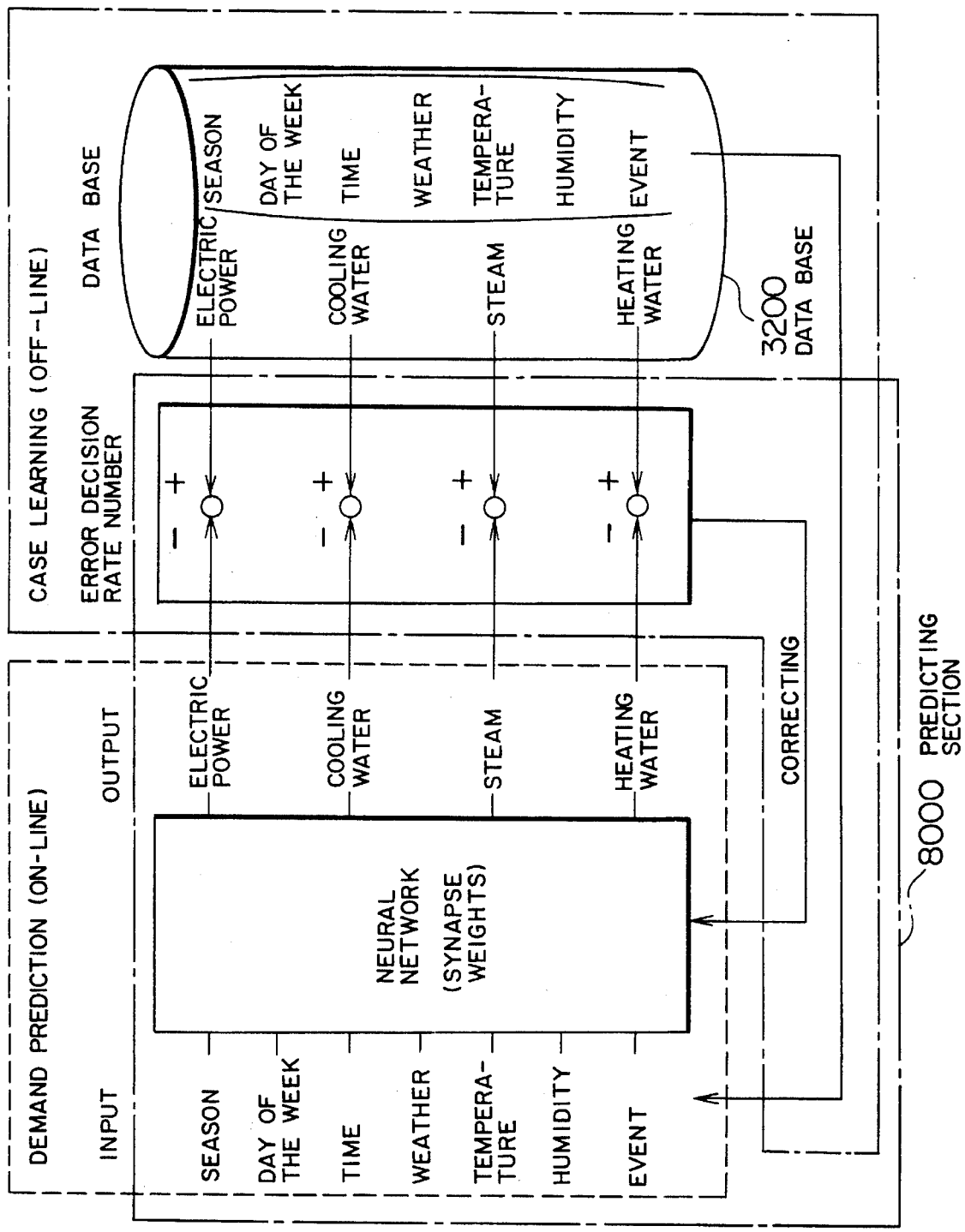
FIG. 12 is an explanatory diagram for practically a learning method of the neural network model.
Figure 14:
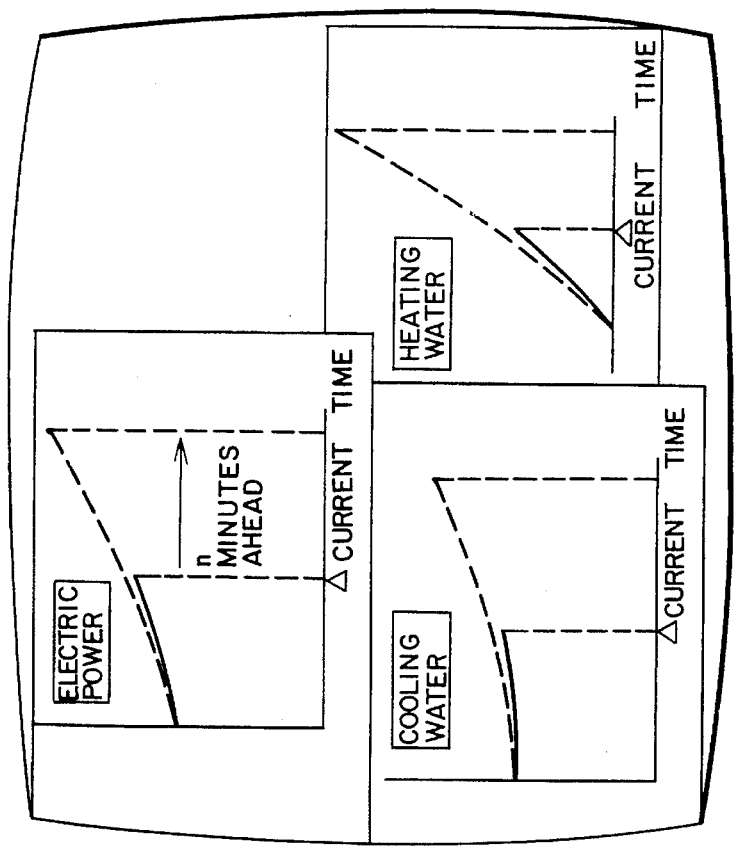
FIGS. 13 and 14 are characteristic diagrams showing output examples of prediction results using the neural network model.
Figure 13:
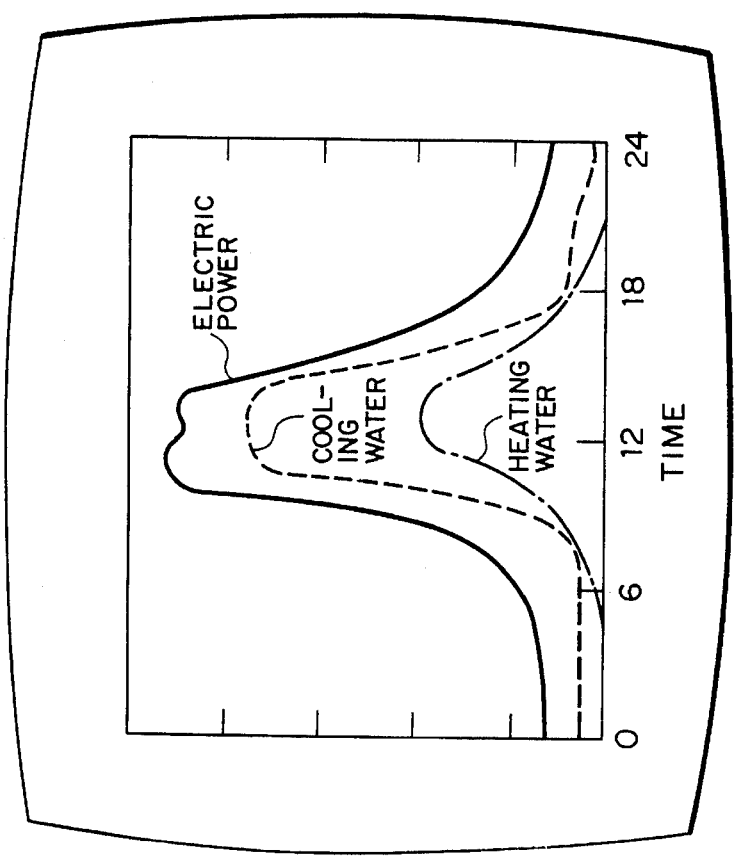

Practical examples of the first and second predicting sections 3100 and 3300 in the predicting section 3000 will now be described with reference to FIGS. 12 to 14. FIG. 12 shows concepts of the actual learning in an off-line mode and prediction in an on-line mode, in both of the predicting sections. In FIG. 12, a predicting section 8000 denotes an element which is common to the first and second predicting sections 3100 and 3300. In dependence on which combination of an input and an output is used as learning data, the structures of synapse weights which are formed therein differ from each other and use different objects. First, data indicative of electric power, cooling water, steam, and heating water corresponding to a season, a day of the week, a time, a type of weather, a temperature, a humidity, an event, and the like from the data base 3200, in which cases as past examples have been stored, is used for learning in the off-line mode. If a difference between the data in the data base 3200 and the output of the neural network model is smaller than a set value, the learning is finished. Subsequently, by switching to the on-line mode, actual data is fetched and the demand prediction is started. In such a case, generally, the data is subjected to normalization, a biasing process, or the like, through an interface I/O for data fetching and is supplied to the neural network model. By using such a method, for example, a demand pattern for tomorrow is displayed on a CRT screen as a pattern as shown in FIG. 13 and is proposed to a worker or operator. On the other hand, as a second prediction result, the prediction result provided up to now, an actual error and a future predicted value are displayed on the CRT and proposed to the worker or operator, as shown in FIG. 14.

Figure 15:
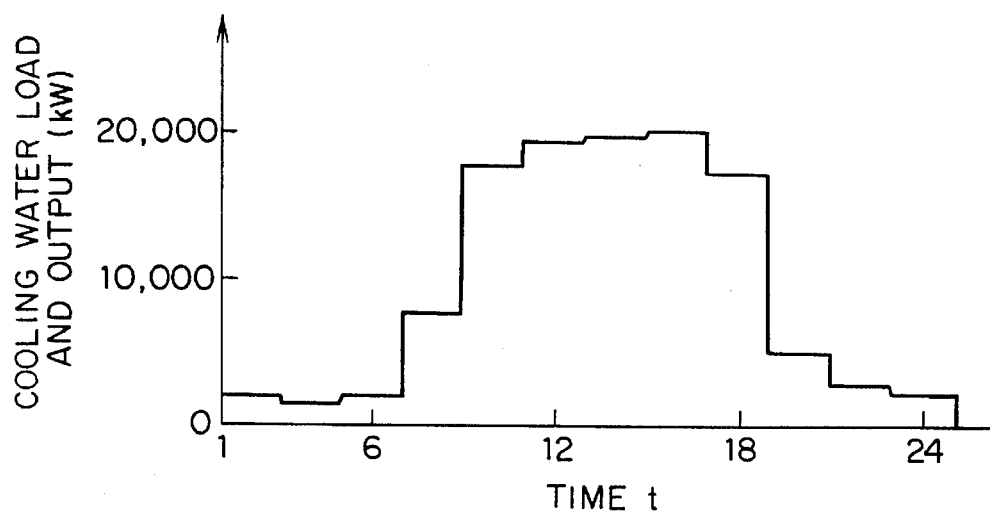
FIG. 15 is a graph showing an example of a predicted corrected energy pattern.

The operation of the demand adjusting section 4300 in the control function 4000 will now be described by using FIGS. 15 to 19. Generally, the output of cooling water in summer is large and a plan has been made to efficiently operate a plurality of refrigerators. In the case where the corrected energy pattern 41 of the cooling water is given as shown in FIG. 15 and the cooling water output is shared by seven refrigerators shown in Table 1 below, an example of a combination of the cooling water output and the refrigerators will now be shown in FIG. 16 with respect to a coefficient of performance indicative of the efficiency of each refrigerator and the capacity of the refrigerator.

TABLE 1

| No. | Kind | Refrigerating capacity (refrigerating tons) |
|---|---|---|
| 1R | AR | 500 |
| 2R | AR | 1,400 |
| 3R | AR | 1,400 |
| 4R | GR | 4,700 |
| 5R | SR | 8,000 |
| 6R | SR | 8,000 |
| 7R | SR | 8,000 |

Figure 16:
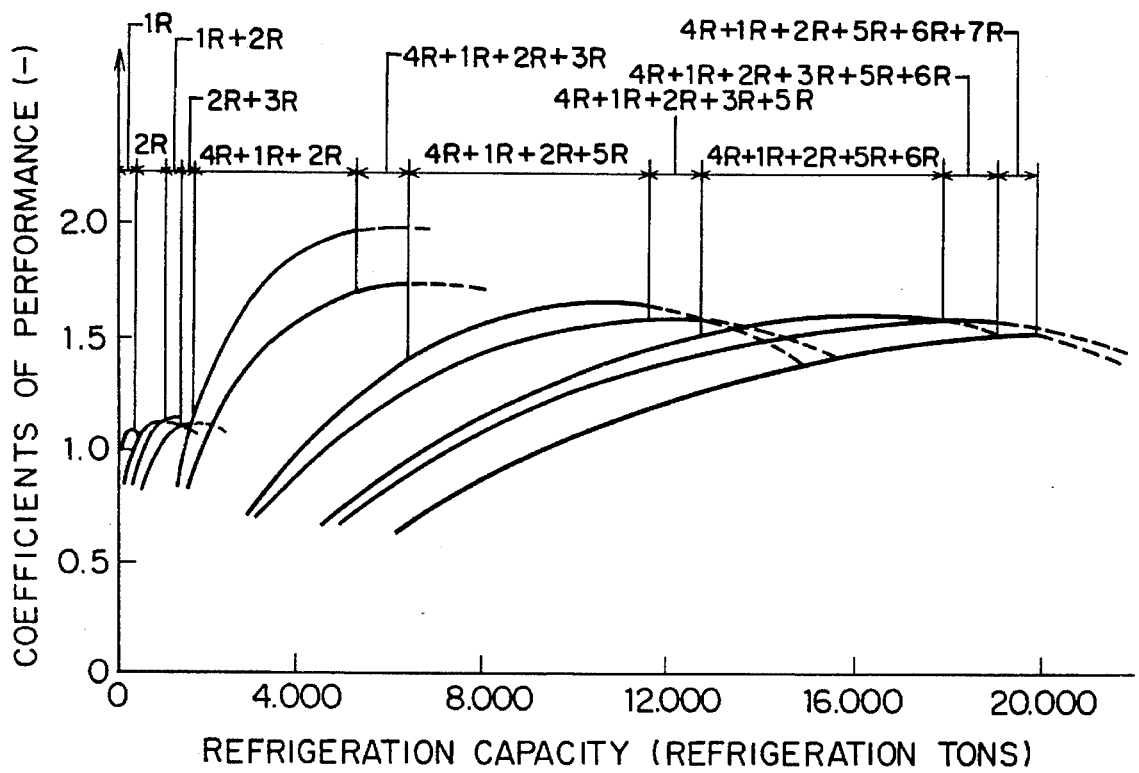
FIG. 16 is a diagram showing the relation between the refrigerating capacity and the coefficients of performance.
Figure 17:
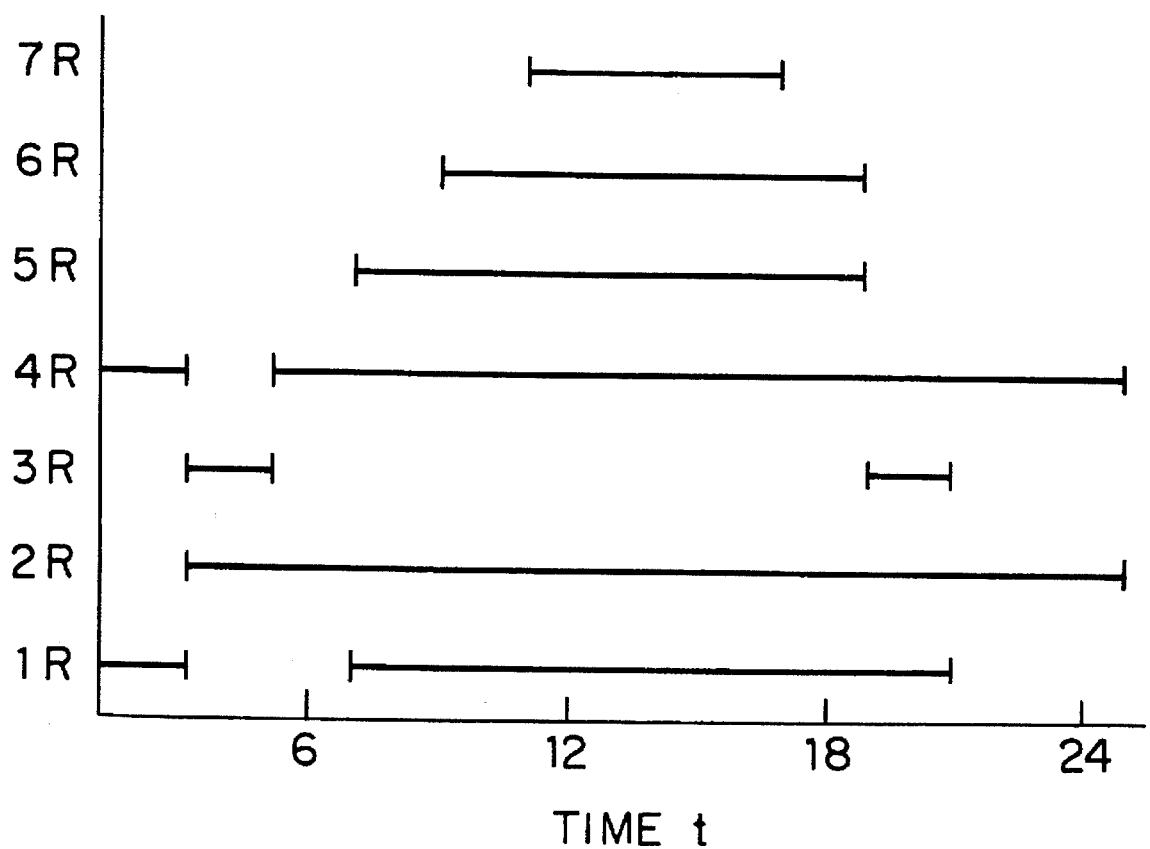
FIG. 17 is a graph showing an example of starting and stopping schedules of a refrigerator.
Figure 18:
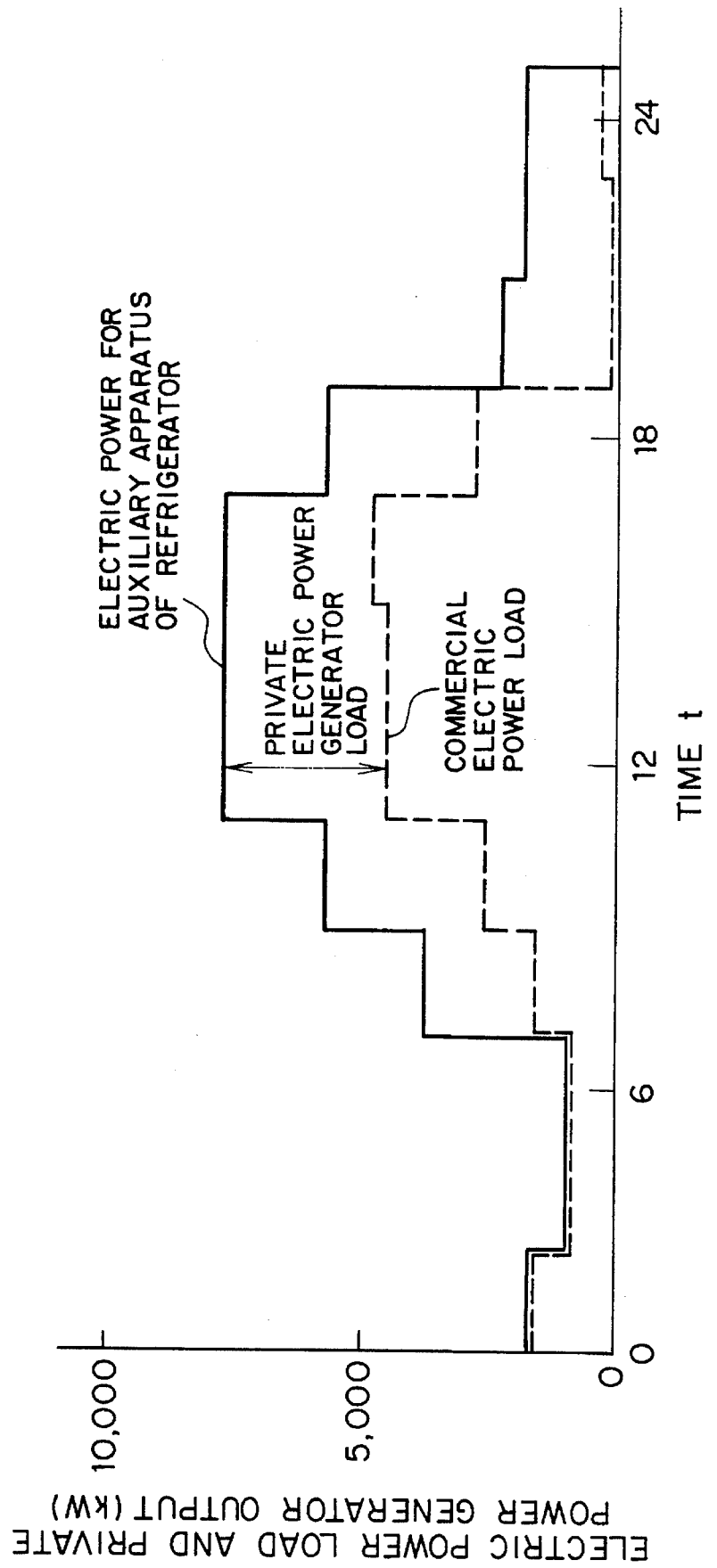
FIGS. 18 and 19 are graphs showing examples of demand patterns of, respectively, electric power and steam.
Figure 19:
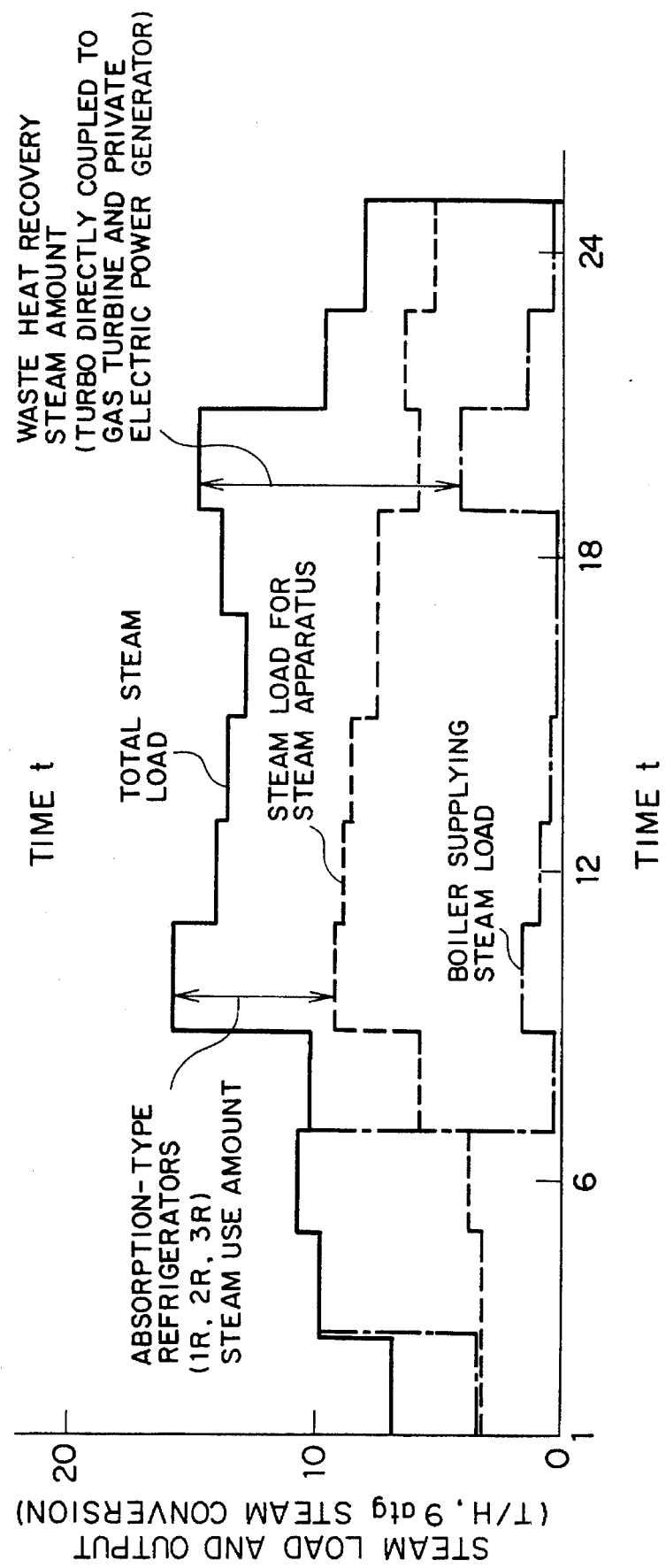

It will be understood from FIG. 16 that even in the case of the same cooling water output, the coefficient of performance largely changes in dependence on the combination of equipment. In the case where the cooling water pattern of FIG. 15 is provided by the refrigerators shown in Table 1, starting/stopping schedules of the equipment are set, as shown in FIG. 17, in consideration of the coefficients of performance in FIG. 16. In addition, to actually operate the absorption-type refrigerator and the turbo refrigerator, fuel, electric power, and steam as energy sources are necessary. FIG. 18 shows an electric power load pattern in the case of the cooling water pattern of FIG. 15. FIG. 19 shows a load pattern. To operate the turbo refrigerator, auxiliary electric power to operate the refrigerator is needed. However, such electric power cannot be ordinarily so increased in terms of the relation with the contract demand, and this portion is produced by a private power generator using a gas turbine, a steam turbine, a gas engine, and the like. For example, in the case where a gas turbine is used, the equipment operation amount 50 for designating a gas amount as an input of the gas turbine is generated. Further, when the equipment operation amount 50 as an operation amount to be supplied to the waste heat recovery-type boiler is generated to generate the steam necessary for the cooling water demand and the steam demand from the exhaust gas generated by the gas turbine, the steam necessary for the absorption-type refrigerator and the steam necessary for the steam are produced. If the necessary steam amount is lacking even by the above method, the equipment operation amount 50 is generated to individually activate a boiler to generate the steam, thereby coping with the steam demand. As mentioned above, since the types of operation of the energy generating equipment which meet the energy patterns are mutually related, it is necessary to make schedules by sufficiently grasping the mutual relations and by also considering the costs which will be required to start and stop the equipment.

Figure 20:
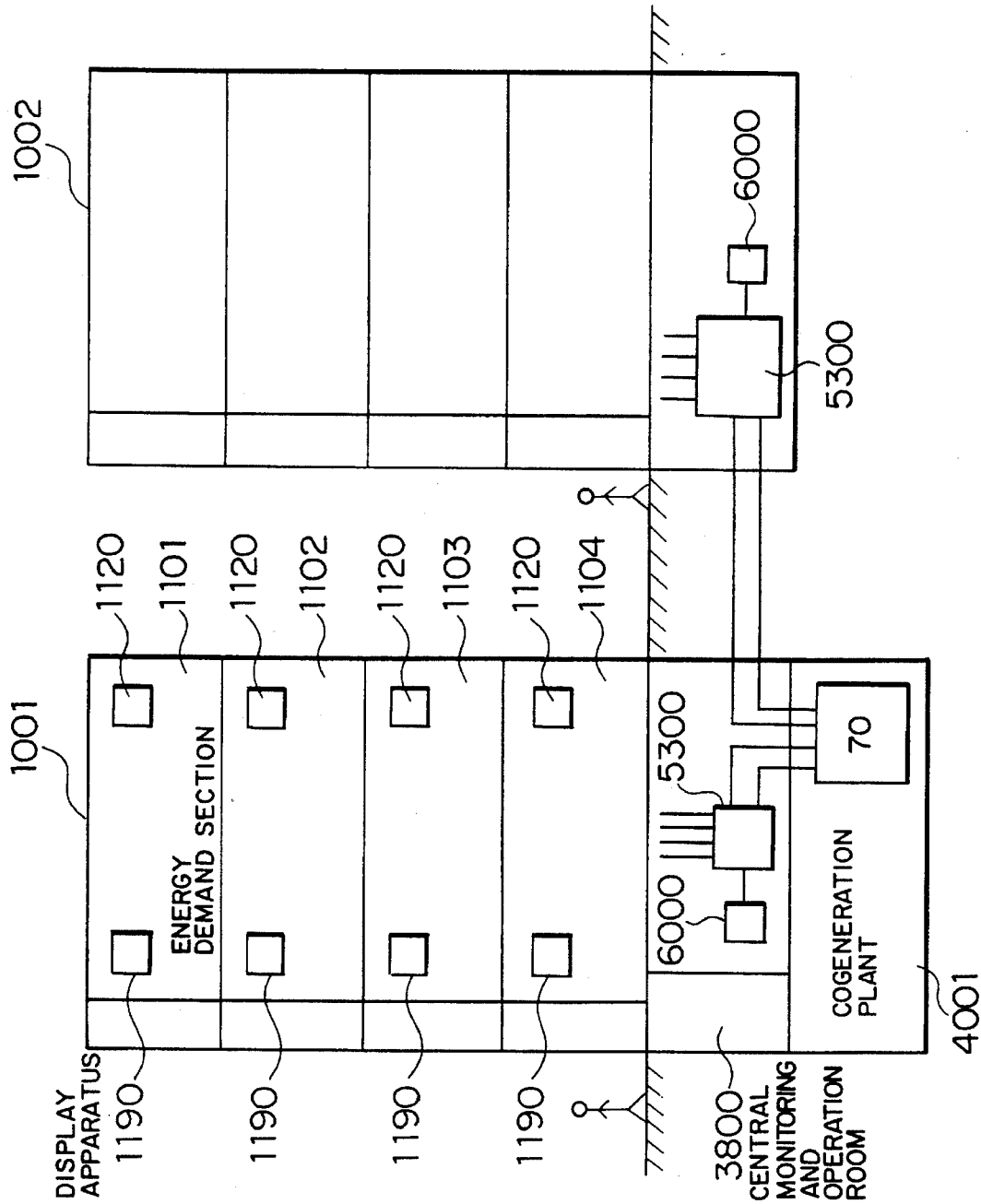
FIG. 20 shows an example of an energy supply system in accordance with the present invention which has been supplied to a district comprising two buildings.

FIG. 20 shows an example in which a cogeneration plant 4001 is provided in the underground portion of one district 1001 in the community, and the energy generated by the plant 4001 is supplied to sections in two districts 1001 and 1002 in the community. A district 1001 is shown having four energy demand sections 1101 to 1104, a central monitoring room 3800, and an evaluating function 6000. A measuring apparatus (not shown in the diagram) having a personnel flow detecting section is installed in the entrance portion of the district 1001 in the community to detect and count persons who enter and leave the district 1001. It is desirable that the measuring apparatus have not only an ability to count the number of persons, but also an ability permitting the destinations of the persons to be detected by ID cards or image processes or the like, these can be input by areas of destinations identified at a reception desk. A display apparatus 1190, having an ability to detect the number of persons present in each section and an evaluation input terminal 1120, having an ability to input the evaluating result in each of the sections 1101 to 1104, are provided for each of the sections. A utility tunnel 70, having therein wires and pipes for transfer of energy generated by the cogeneration plant 4001, is provided between the districts 1001 and 1002. Each of the measuring apparatus, display apparatus 1190, and evaluation input terminals 1120 has therein a predicting section 3000 and a control section 4000, and the apparatuses are connected to a central processing unit arranged in the central monitoring room 3800 via communicating means, such as a cable, an optical fiber, or the like.

The operation will now be explained.

In the case where a state of the going in and out of persons has been observed at the entrance of the district 1001 and their destinations have been detected, the predicting section 3000 calculates a time when the persons present in a section will change, by calculating the sum of the number of persons to be increased or decreased and the number of persons present in the section by use of a display apparatus 1190, thereby predicting necessary energy in the section. On the other hand, a state of change in load demand of one day is also predicted on the basis of a variation thereof in energy. Further, the central processing unit in the central monitoring room 3800 calculates a time when such energy change is necessary on the basis of the distance from the entrance to the section. In the re-scheduling section 4400, the states of the energy equipment in the operating state at present and the states of the equipment capable of being operated are detected. A check is made to see whether or not the necessary energy can be supplied by the equipment which is at present in the operating state, taking into consideration their safety ratios, and whether or not there is a starting and stopping method in which the necessary demand can be satisfied and the costs can be minimized in consideration of the predicting result for the demand of one day. As a result, start and stop signals of each energy generating equipment are transferred to the equipment demand share adjusting section 4300. In the demand adjusting section 4300, the energy necessary for the section is determined taking into consideration the starting and stopping schedule of each energy equipment. An operating state of each energy generating equipment is determined to minimize the operation costs, for instance, a share of generation of the energy by the equipment. A working operation amount of each energy generating equipment for such a purpose is transferred to the energy plant 4001. At this time, it is desirable to start, stop, and operate the energy generating equipment in consideration of the time required until the persons reach the section from the entrance of the district 1101 and the time delay until the generated energy due to a change in demand reaches the section. In addition, in the demand share adjusting section 4500, an adjustment operation amount is transmitted to the plant 4001 to distribute the whole generated energy to the changed necessary energy demands of the section in accordance with an increase or decrease in the number of persons in the section. The energy generating equipment in the plant 4001 receives the working operation amount to generate the whole necessary energy on the basis of the new prediction. By receiving the generation energy and the adjustment operation amount, the valves, dampers, and the like for supplying process electric power, process cooling water, process steam, and process heating water are adjusted. Thus, the energy which is needed for the section, is supplied from the plant 4001 to the districts 1001 and 1002. In the district 1001, an operation amount for assigning the supplied energy to the sections 1101 to 1104 iS determined by an adjusting section of the district 1001 in accordance with the energy demand which has been predicted by the predicting function 3000, and energy is distributed to the sections. In each section, air conditioning, illumination, and the like are provided by use of the supplied energy. From the result, the evaluations of the sections are supplied by the evaluation input terminal 1120.

It is desirable to install one or more evaluation input terminals 1120. In example of the air conditioning, an evaluation indicating that it is hot or slightly too cold in the present situation is supplied from the evaluation input terminal 1120 as an evaluation value for the section in the form of the numerical value or a quantitative expression. In the evaluating section 6000, evaluations of the whole section are combined on the basis of those evaluations and generated as an evaluation value distribution. As such an evaluation value distribution, for instance, an evaluation value distribution indicating that it is slightly hot at a position near the blow-out portion and is cool at a position away therefrom is generated. When receiving this information in the environment setting section 6200, an adjustment operation amount is searched for, to enable setting a temperature distribution, an air current distribution, and the like in the range of optimum or comfortable distributions as a whole. This accomplished by searching for a case similar to past operation examples in the data base 6400 in which the knowledge of the skilled persons, designers, and the like have been stored, or by simulating and determining Valves of the air current or temperature distribution in order to establish an optimum evaluation distribution of the temperature, air current, etc. to form a comfortable environment. To obtain the optimum evaluation value distribution using the reference operation amount setting section 6300 and the environment setting section 6200, the adjusting section generates operation amounts, for an angle of a vane in a blow-out portion, an opening degree of a damper, and the like, to determine a blow-out speed and a direction of the air flow at each blow-out position in the section 1101. In the adjusting function, the operation amounts are received, and the energy necessary for the section 1101 is distributed to achieve the optimum evaluation value distribution, thereby accomplishing the evaluation predicted for satisfaction in the section. If the distribution of the evaluation values from the section 1101 coincides with the optimum evaluation value distribution at this time, the energy amount and the operation amount at this time and the present values and deviation are stored as examples in the data base.

As mentioned above, the operation of an energy supplying system has been described which can rapidly and accurately predict variation in energy demand by detecting the personnel flow at the entrance of the district 1101 and can effectively use the energy also in consideration of the evaluations of the persons who dwell there.

Figure 21:
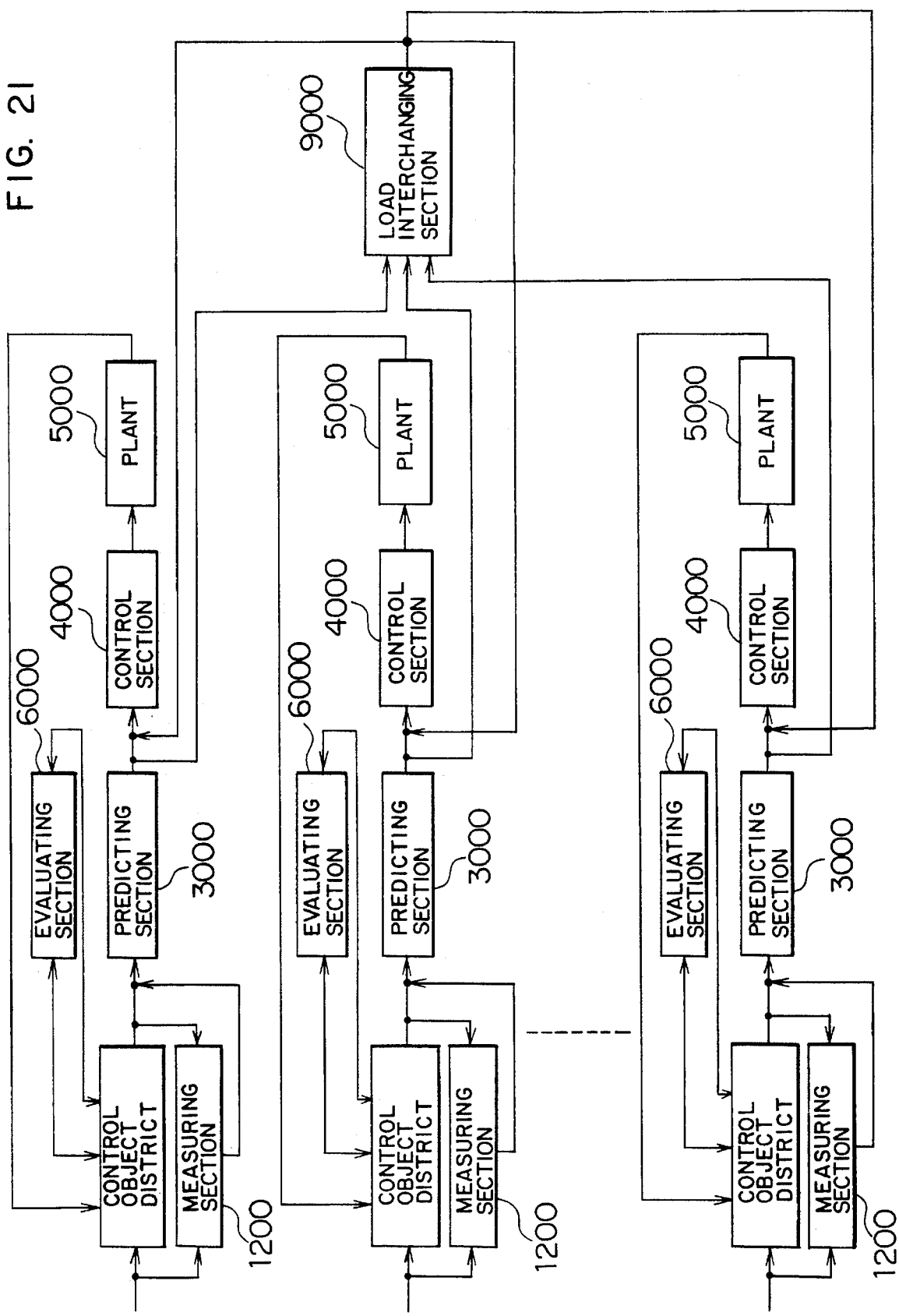
FIG. 21 is a constructional diagram showing an example in which the energy supply system of the present invention has been applied to a system such as an urban system which is constructed of a plurality of systems, each having the construction of FIG. 1, and in which a plurality of plants mutually accommodate a load.

FIG. 21 shows an example in which the present invention has been applied to an urban area comprising a group of buildings. In the example, the community is capable of performing a plurality of processes each including one plant. The operation of each process is almost the same as that in FIG. 20. It is different in that a load interchanging section 9000 for controlling the entire urban area exists, to monitor and evaluate the state of load of each plant and to interchange and adjust energy among the plants. Therefore, the energy predicted value for each plant 5000 is supplied to the load interchanging section 9000. Correction of each energy predicted value is performed by the control section 4000, thereby improving the energy efficiency as a whole.

The above point will now be described in more detail hereinbelow. There are dependent relations of certain degrees among the energy generating equipment forming the cogeneration plant, i.e., the electric power generator 5100, cooling water generator 5200, steam generator 5300, and heating water generator 5400. For instance, if gas is combusted using a gas turbine, the amount of combustion exhaust gas which is generated at this time is determined approximately. An amount of steam which is generated in the waste heat recovery-type boiler by using the combustion exhaust gas, is also determined. Further, an amount of cooling water which is produced by the steam absorption-type refrigerator by using steam, is also determined. Therefore, it is difficult to determine a combination in which all of the energy can be utilized without any waste. Actually, there are many cases where some energy is consumed in vain. However, in the case where a system comprises many plants, and various kinds of districts are included in the community, the total loss can be minimized by evaluating the characteristics of the plants and by interchanging and adjusting the loads. Therefore, in the load interchanging section 9000, the characteristics of the load of each plant and the characteristics of the demand predicted values are input and the predicted demand values as outputs from the predicting section 3000 are corrected and generated as a corrected energy pattern for the control section 4000. In the control section 4000, the operation amount is processed by the equipment demand share adjusting section 4300 and the re-scheduling section 4400, on the basis of the corrected energy pattern, and the working operation amount is supplied to the plant 5000. The adjustment operation amount from the demand adjusting section 4500 is generated for the plant 4000.

The subsequent operation is similar to that in FIG. 20, and its outline will now be described. The energy generating equipment in the plant 5000 receives the working operation amount and generates the total energy which will be necessary on the basis of a new prediction. On receiving the generation energy and the adjustment operation amount, the valves, dampers, and the like for supplying process electric power, process cooling water, process steam, and processing heating water, which are necessary for each process, are adjusted. Thus, the energy necessary for each section is supplied from the plant 5000 to the districts 1001 and 1002. In the district 1001, in the adjusting section of the district 1001, an operation amount for assigning the supplied energy to the sections 1101 to 1104 is determined in accordance with the energy demands which have been predicted in the predicting section 3000. The energy is distributed to each section. In each section, air-conditioning, illumination, and the like are provided on the basis of the supplied energy. By receiving the results, the evaluations in the section are supplied from the evaluation input terminal 1120. In the evaluating section 6000, the evaluations of the entire section are combined on the basis of the above evaluations and are provided as an evaluation value distribution. Upon receiving this information, the environment setting section 6200 searches for an adjustment operation amount to set the evaluation amounts to whole evaluation values which will provide an optimum or comfortable distribution. In the reference operation amount setting section 6300, in order to accomplish the optimum evaluation value distribution derived by the environment setting section 6200, operation amounts are generated for the adjusting section, which are for angles of the vanes, opening degrees of the dampers, and the like, in the blow-out portion to determine the blow-out speed and direction of the air blowing at each blow-out position in the section 1101. In the adjusting section, the operation amounts are received, and the energy necessary for the section 1101 is distributedly output to obtain the optimum evaluation value distribution, thereby accomplishing the evaluations estimated for satisfaction in the section.

Figure 22:
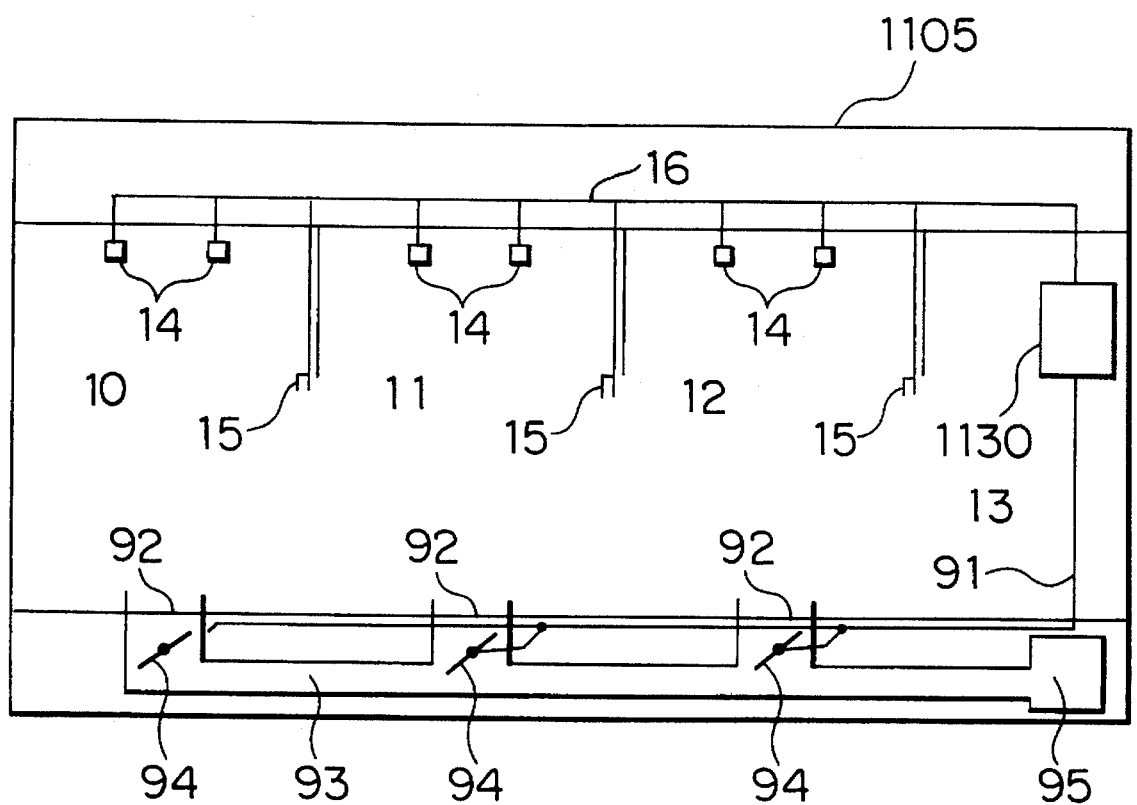
FIG. 22 is a constructional diagram showing an example in which a process control function of the present invention has been applied to a system which also considers environment.

FIG. 22 shows an example of one section in a relatively closed space, such as found in an underground urban area, a very high building, or the like.

A section 1105 is includes four rooms 10 to 13, a ceiling, and an underfloor portion. A signal transmission cable 16 for transmitting signals to a monitor board 1130, which has a control function and terminals, is installed in the ceiling portion of the section 1105. Integrated multi-function sensors 14, each having an ability to detect the environment in the room, and personel flow detecting sensors 15 are connected to the cable 16. A duct 93 for supplying gas, fragrance, and the like for ventilation and atmospheric adjustment is installed in the underfloor portion of the section 1105. Vanes 94 and blow-out and suction ports 92 for adjusting the supply of air, fragrance, and the like into or out of the room are arranged in the duct 93. The duct 93 has a supply port for connection to an apparatus capable of supplying an atmosphere adjusting material, a steam supply port (not shown in the diagram) for air-conditioning, an air cleaner for removing harmful components existing in the air of the room, and the like. The duct 93 is, further, connected to a large duct 95. In addition, the adjusting vanes 94 are connected to the monitor board 1130 through a connection cable 91 and are operated to pass different flow rates in response to opening degree commands received from the monitor board 1130. Further, the monitor board 1130 has therein the function of the evaluation input terminal 1120 in FIG. 9. A construction of a whole system is as shown in FIG. 21. The fundamental operation of the system is similar to FIG. 1. There is shown in FIG. 22 a section 1105 as an example of the sections.

Referring to FIG. 22, it is now assumed that persons have entered a room 10. The persons are detected by the personel flow detecting sensors 15 installed in the room 10. The result is transmitted to the monitor board 1130 through the signal transmission cable 16. The number of persons leaving is counted in the room 11 and the number of incoming persons is counted in the room 10, and the counted values are stored in a memory device (not shown in the diagram). In association with the results, the counted values are outputted from the monitor board 1130 to the predicting section 3000. The corrected energy demands are generated from the predicting function, as described previously with reference to FIG. 4. The subsequent procedure is similar to that described with reference to FIG. 4. Thus, the monitor board 1130 receives the adjustment operation amount supplied from the operation amount setting section 6600 of the evaluating section 6000 and generates a command to adjust opening degrees of the vanes 94 through the connection cable 91 to adjust the energy, thereby changing supply or suction air amounts from the ports 92. However, if the vanes 94 are operated and the inflow or ventilation air amount is changed on the basis of the above result, for instance, in the case where the persons quickly return to the room 11, the vanes 94 must be again returned to their original states, and the control system easily becomes unstable. Therefore, it is desirable to change the vanes after it has been determined by checking for a predetermined time duration that such a state continues for a long time. For instance, in the case where a meeting time period is preset for a meeting room or the like, if a preset time period has previously been input to the monitor board 1130 from a terminal or a computer separately installed therein to manage the meeting room, it is desirable to provide a function such that the environment of the relevant room can be set preliminarily. In addition, even if the number of persons present in the room 10 does not change, when concentrations of substances, such as carbon dioxide gas, dispersed particles, ammonia, hydrogen sulfide, and ions, and the like, in the environment of the room are detected by the integrated multi-function sensors 14 to have exceeded the values which had been set by a person present in the room, signals indicative of such a fact are transmitted from the sensors 14 to the monitor board 1130 through the signal transmission cable 16. The results are transferred as evaluation values 83 from the monitor board to the evaluation distribution making section 6100 of the evaluating section 6000 shown in FIG. 8. The subsequent procedure is similar to that described in FIG. 8. Consequently, the monitor board 1130 receives the adjustment operation amount generated from the operation amount setting section 6600 of the evaluating section 6000 and generates a command to adjust the opening degrees of the vanes 94 through the connection cable 91 to adjust the energy, thereby changing the supply or suction air amount from the port 92. The unnecessary harmful components are removed by an air cleaner (not shown in the diagram) installed to remove such unnecessary components from the air in the room. The air is then supplied or vented. In such a case, it also may be desirable to supply fragrance, sound, ions, and the like, to improve the ambience in the room, from an atmosphere adjusting material supplying apparatus (not shown in the diagram) in accordance with the desires of the persons in the room 10.

In FIG. 22, the ventilation and suction ports 92 have commonly been installed in the floor portion of the section 1105. However, they may be also individually installed or may be installed in the ceiling portion. Although one monitor board 1130 has been provided for the section 1105, even if such a board is installed in each room or even if the monitor board 1130 is commonly used for a plurality of rooms, its effect is similar and is commensurate with the purpose of the present invention.

Particularly, in a facility which is used by only a special person or persons, the preference of such persons is learned in accordance with a learning function, so that the control section 4000 can effectively and easily accomplish the required control to achieve the desired characteristics.

Although various examples of the invention have been described above, they can be arbitrarily combined in accordance with the desired objectives, and the essence of the invention is not changed by such a combination.

According to the embodiments of the invention, the following various effects are attained.

It is a first feature of the invention that a fluctuation in load demand which momentarily changes can be rapidly and accurately predicted. That is, by measuring the environment, personnel flow, and/or object flow and by analyzing the data base according to past cases about the characteristics of the processes or sections, a change in the energy which is needed can be predicted.

It is a second feature of the invention that the optimum operation of the plant is always guaranteed for a load demand which momentarily changes. That is, if the neural network model provided in the control function has sufficiently learned the optimum operating method corresponding to the past operation cases, when an operation target is given, the optimum operation always can be achieved.

It is a third feature of the invention that the distribution of the energy can be optimized.

When the evaluations, according to the situation which momentarily changes, as received from a section requiring various energies, are made to be an evaluation value distribution, and the evaluation value distribution is optimized, the operator sets various requests and weights for them into the control function. By this, the necessary evaluation value distribution can be obtained. By using such a distribution as a case, if the neural network model provided in the control function has sufficiently learned the optimum distributing method corresponding to the past operation cases, when an evaluation value distribution is given, the optimum evaluation value distribution always can be achieved.

It is a fourth feature of the invention that the energy required according to changes in environment and personnel flow can be supplied.

The environment and personnel flow are measured, the necessary energy is predicted, a change in energy demand of one day is considered, the operation of the minimum energy, including the loss due to the starting and stopping characteristics of the energy generating equipment, can be accomplished, and the energy required for the existing persons can be supplied.

It is a fifth feature of the invention that the environment in the room can be optimally maintained.

The invention can be accomplished by adding a capability to load components such that the environment in the room is measured, harmful components and unnecessary components can be eliminated, and a high operating efficiency and a high working efficiency can be maintained.

In the above embodiments, the community denotes a predetermind district or a community society in which community life is performed. In the present invention, the "community" means a district to or from which persons enter or exit, that is, a district mainly comprising office buildings in which a plurality of office buildings are located, a district mainly comprising apartments in which a plurality of apartments are located, a district mainly comprising facilities such as a school, a museum, and the like, or a district mainly comprising department stores, personal shops, and the like.

The present invention can be applied to one or a plurality of communities. Particularly, the present invention is suitable for use in a district where a mixed plurality of communities exist. Since the present invention is applied to one or more communities as mentioned above, it is referred to as an urban energy system.

It is desirable that the urban energy system of the present invention include energy supply pipeline network control means for controlling an operation amount of the energy supply pipeline network on the basis of the results of a demand plan formulation and demand variation detecting.

Thus, the amount of energy necessary for the community is supplied. The extent of operation of the energy supply pipeline network is controlled in such a manner that, for instance, when a plurality of communities exist, the opening degree of a valve of the pipeline to one of the communities is decreased, and the opening degrees of valves of the pipelines to the other communities are increased. If the energy demand variation is grasped determined in advance and the operation amount of the energy supply pipeline network is previously controlled, the necessary amount of energy can be supplied with proper timing when the community truly needs the energy.

It is preferable that the demand plan making means have a learning function for past cases, i.e. year/month/time data, weather data, personnel data, and the like, as input items.

The year/month/time data denotes data regarding the year, month, day, day of the week, week, season, and the like. The weather data denotes data with respect to the weather, such as atmospheric temperature, humidity, water temperature, wind speed, rainy day, fine day, cloudy day, and the like. The personnel data denotes data with regard to the number of persons.

The demand plan making doesn't necessarily include a learning function, but may be also constructed in such a manner that an energy demand obtained by collecting and statistically processing a plurality of past cases of the same or similar month and day of the week or a mean energy use amount of the week obtained on the basis of past cases of the same month and day of the week are used as the energy demand. On the other hand, the energy use amount of yesterday or today can be also directly used as an energy demand for tomorrow.

In the season when variations of the weather conditions are small, a mean energy demand for a month may be determined as the energy demand at such a period of time. An arbitrary method of determining the energy demand may be used so long as it is determined on the basis of past cases, and the present invention is not limited to the above methods.

The energy demand can be also determined on a day unit basis or on a week unit basis or may be also determined as a long-range prediction of a few months. In the case of determining the energy demand as the prediction of a long period of a few months, some of the equipment of the energy plant can be set into a rest state or maintenance can be performed on the basis of the prediction value. The method of determining such an energy demand is not limited to the above method, so long as it is obtained with respect to time.

The invention is not limited to the existing community, but also can be applied to an urban area in which a new community has been added to an existing, or to a new urban area comprising only new communities.

For the urban area in which a new community has been added to an existing community, it is desirable to determine ahead of time an energy demand for the existing community on the basis of past cases and to obtain an energy demand for the new community on the basis of a plan value of an energy amount when the new community is planned.

When the energy demand for the new community obtained on the basis of the energy amount plan value by the urban plan is corrected on the basis of the personnel flow measured values, it is preferable to refer to the case of an existing community similar to the new community.

To embody the present invention, when the energy demand is planned by the formulated energy demand plan, it is desirable to handle the personnel data, weather conditions, year/month/time data, and the like as parameters.

With the above method, the personnel flow measured value measured by the personnel flow measuring apparatuses can be compared with the number of personnel used as a reference when the energy demand has been determined by the formulated energy demand plan to obtain a deviation between them, and a variation of the energy demand from the plan value can be obtained by use of the deviation.

The demand plan formulation individually employs the energy use amount in a steady state of the community and the energy use amount in the unsteady state according to past cases. The energy use amount in the unsteady state denotes an energy use amount in the case where various attractions, such as events or the like, have been performed in the community, or where a fire or other accidents have occurred. By preserving the energy use amounts in such unsteady states with respect to personnel, even if the personnel flow measured value largely differs from the measured value in the steady state because an accident, a fire, or the like has occurred in the community, the present invention can properly cope with such a situation and can supply the necessary energy to the community.

If the existence of events or the like in the community has previously been known, it is also desirable to determine the energy demand on the basis of past cases in which such events had been performed.

In the present invention, it is desirable to obtain the energy demands on at least a day unit basis for the demand plan formulation with respect to time. It is also desirable for the energy demand variation detection to determine detection of a deviation of the energy demand from the plan value in the future after passage of tens of minutes or a few hours.

The present invention also proposes that the energy demand variation be detected on the basis of weather information instead of personnel. The method of determining the energy demand variation in accordance with weather information makes the present invention applicable to a season or a district in which the weather conditions largely differ between, for instance, yesterday and today or in which the weather suddenly changes within a day. The energy demand variation also may be obviously obtained on the basis of both the personnel flow measured values and the weather conditions.

The present invention also can be applied to a system having a plurality of energy plants for supplying a plurality of different energies to the communities. In such a case, it is sufficient to individually apply the foregoing methods to each of a plurality of energy plants.

In the case of practical embodiments of the present invention, it is desirable to have an evaluating function and a simulating function, so that an evaluation distribution of the energy on the demand destination side is formed on the basis of the evaluation from the community as a demand supply side, and simulation is performed to obtain the optimum evaluation distribution and such an evaluation distribution can be provided.

It is also desirable to have a control section so that the optimum scheduling of the amount of equipment to be operated and the minimum cost operation can be achieved for the predicted demand.

It is, further, desirable to have a control function of the system which learns and grows on the basis of the actual operation results.

In the present invention, it is desirable to install the personnel flow measuring apparatuses at paths to the community, such as at the entrance and exit of a road, entrance and exit of a station, entrance and exit of a building, and the like. It is also desirable that the personnel flow measuring apparatuses count not only the number of personnel but also the number of vehicles or the like. The number of vehicles is also incorporated in the personnel flow measurement in the present invention.

According to the personnel flow measuring apparatuses, the number of passersby is measured by using a measuring device which is used to manage the going in and out of persons and objects, as in the case of ID cards, image process, ultrasonic wave, light application, and the like.

In the energy demand plan formulation, an energy demand is determined by regression analysis, or a multivariate analysis based on the past actual data, a prediction by linear programming, knowledge processes such as a Fuzzy reasoning or the like using a data base including the knowledge of skilled operators, and systems using a neural network or the like which has learned on basis of the past cases.

In the foregoing evaluating function, there is included evaluation of the thermal efficiency of the process, a productive efficiency, an amenity (sensible temperature, humidity, odor, air current, illumination, etc.), the environment ($NH_3$, $NO_x$, $SO_x$, radon, etc.), air quality (ozone, ion, dispersed particles, or the like), and the like.

The energy also denotes electric power produced by the energy plant in addition to the cooling water, steam, heating water, and the like.

The energy plant denotes an energy generating system such as an electric power generating plant, a district heating and cooling plant, cogeneration, or the like.

In the demand plan formulation, it is desirable to obtain not only the energy demand of the whole community, but also the energy demand of each part of the community. In the case of varying the energy demand which has previously been obtained on the basis of the personal flow measured value, the individual energy demand which has previously been obtained for every part of the community is useful.

It is desirable to provide an adjusting function such that the energy demand plan is executed for every county in an urban area, the demands are collected to set as a predicted demand in the urban area, and the energies distributed on the basis of the demands are distributed in accordance with the requests of the communities in the urban area, an evaluating function for totally judging the evaluations from the communities, and a simulating function for selecting an operation amount which can accomplish an energy distribution sufficient to satisfy the evaluations of the communities on the basis of the result of the evaluation.

It is desirable to provide a scheduling function for selecting schedules to start and stop equipment of high energy efficiencies in consideration of the plan value based on the prediction of a long period of time, and the predicted demand of a short period of time which considers a variation from the present value, an optimizing function to decide demand shares of the equipment such as to minimize the costs in consideration of the predicted demand on a day unit basis, and an adjusting function to distribute the energy to the districts on the basis of the demand prediction of each district of the community.

To analyze the actual measured data, it is possible to use a mathematical scientific method, such as multiple regression analysis, method of least squares, or the like, or a method of deciding a weight matrix of a neural network using a neural network model, or the like.

Since there are provided a demand plan based on past cases of the communities, or the plan value of the energy demand by the urban plan, and the demand variation based on personnel flow or weather information, the amount of energy according to the demand of the community can be prepared and supplied to the community.

In the evaluating section and the control section, the evaluation value distribution is generated by the evaluating function to totally judge the evaluation value obtained from those demanding service in the community. To improve the evaluation value distribution on the average, simulations are repetitively executed so that the evaluation values are optimized or averaged by the simulating function. At this time, the calculating time of the simulating function can be reduced by referring to past cases on the basis of the data base.

The energy distribution to accomplish the optimum evaluation value distribution derived by the repetition of the simulations is transferred to the optimizing section. In the optimizing section, the operation amount for selecting an energy distribution for accomplishing the transferred energy distribution and for achieving a highly efficient using state is determined by the neural network model, Fuzzy reasoning, multivariate analysis, regression analysis, and the like, using past cases or the data base.

In the measuring section, the going in and out of persons or vehicles is detected by an ID card, a photo sensor, an ultrasonic sensor, or the like by personnel flow measuring apparatuses provided at a position on paths to the community to be controlled. As another method, a change in weather conditions in the community is compared with the value used as a reference when physical values of the temperature, humidity, and the like have been measured and the energy demand has been obtained by the formulated energy demand plan, thereby calculating a deviation. Since a demand from the community as a minimum unit, which needs a plurality of types of energy, can be predicted, a change from the present demand can be promptly predicted and corrected and the predicting accuracy can be improved.

On the other hand, in the energy demand predicting section, by using Fuzzy reasoning based on If-Then rules from the data base on the basis of the measured values of the present personnel or weather conditions, or a method and a system having a learning function from the cases such as multivariate analysis or regression analysis using conventional cases or a neural network model learning or the like, a deviation from the set standard value on a day unit basis is predicted, and a demand for tomorrow can be predicted as a forecast energy demand.

On the other hand, in another energy demand predicting section, a deviation from the prediction value on a day unit basis is momently predicted and updated on the basis of the deviation measured by the measuring section and the predicted values of the humidity and the like and is supplied to the control section (starting and stopping schedules) and the optimizing section, thereby allowing an efficient operation control to be performed.

In the control section, the optimum starting and stopping schedules of the equipment in taking into consideration a change in demand prediction on that day are determined while satisfying the predicted maximum demand of one day.

In the optimizing section, an operation amount of each equipment to decide a demand share of each equipment in each time zone is determined in consideration of an efficiency characteristic of each apparatus with respect to the demand on a day unit basis and is transferred to the energy plant having therein a plurality of types of energy equipment.

Further, in the adjusting section, adjustment operation amounts of valves, dampers, vanes, and the like, to distribute the energy, which is necessary to successful operation of the system and which have been obtained from the total of the forecast demands to the energy which is needed to each district in the community, are transferred to a distributing function provided for the energy plant.

The energy plant comprises a power generator such as gas engine, gas turbine, diesel engine, or the like, for generating electric power using gas, petroleum (kerosene, light oil), or the like, as a fuel for generating equipment, such as a waste heat boiler for generating steam by collecting the heat energy of an exhaust gas generated in association with the combustion of the above fuel, an such as a heat exchanger for generating heating water, an exhaust gas absorption refrigerator, a steam absorption refrigerator, a turbo refrigerator for generating cooling water, a boiler for generating steam, and the like, and a distributing function which is constructed of a 3-way valve, an exchange valve, and a stop valve serving as controllers for supplying various types of energy to the communities, various vanes, and the like.

The operation amounts transferred from the control section are transmitted to a plurality of types of energy generating equipment and are used to operate those apparatuses in order to generate the desired energy. The adjustment operation amounts are transferred to various valves in the distributing section as an opening degree command and a stop signal in order to distribute energy in correspondence to the forecast demands from the districts of the community. Thus, the various valves are made operative and the energy necessary for each community is supplied to the relevant community. The adjusting section is constructed of a 3-way valve, an exchange valve, a stop valve, and the like, serving as controllers for distributing the energy which has been distributed on the basis of the demand predictions to the communities and to distribute the energy to those in demand in each district in a manner similar to the above distributing section. In each community, the evaluation regarding the energy which has been adjusted and supplied is supplied as an evaluation value to the control section.

What is claimed is:

1. An urban energy system for controlling an energy plant supplying energy to a community and an energy supply network connecting the energy plant to the community, said system comprising:

energy demand plan making means for predicting in advance an energy demand of the community on the basis of the past energy demands of the community and past personnel flow patterns of the community and for making an energy demand plan for the community on the basis of the predicted energy demand;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand on a selected day, based on forecasted weather conditions for the community for the selected day and on the net personnel flow measurement signal on the selected day; and energy plant control means for controlling the energy plant on the basis of the energy demand plan and the predicted variation.

2. An urban energy system for controlling an energy plant supplying energy to a community and an energy supply network connecting the energy plant to the community, said system comprising:

energy demand plan making means for predicting in advance an energy demand of the community on the basis of past energy demands of the community and past personnel flow patterns of the community and for making an energy demand plan for the community on the basis of the predicted energy demand;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand, when personnel flow reaches the community on a selected day, based on forecasted weather conditions for the community for the selected day and on the net personnel flow measurement signal on the selected day; and energy plant control means for controlling the energy plane on the basis of the energy demand plan and the predicted variation.

3. An urban energy system for controlling an energy plant supplying energy to a community and an energy supply network connecting the energy plant to the community, said system comprising:

energy demand plan making means for predicting in advance an energy demand of the community on the basis of past energy demands of the community and past personnel flow patterns of the community and for making an energy demand plan for the community on the basis of the predicted energy demand;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand, when personnel flow reaches the community on a selected day, based on forecasted weather conditions for the community for the selected day and on the net personnel flow measurement signal on the selected day; and energy supply network control means for controlling operation of the energy supply network on the basis of the energy demand plan and the predicted variation.

4. An urban energy system for controlling an energy plant supplying energy to a plurality of communities and an energy supply network connecting the energy plant to the plurality of communities, said system comprising:

energy demand plan making means for predicting in advance an energy demand of the plurality of communities on the basis of past energy demands of the plurality of communities and past personnel flow patterns of the plurality of communities, and for making an energy demand plan for the plurality of communities on the basis of the predicted energy demand;

personnel flow measurement means for measuring flow of personnel into and out of the plurality of communities and providing a net personnel flow measurement signal indicative of the net personnel flow;

means for receiving a forecast of weather conditions for the community;

energy demand variation predicting means for predicting a variation in the predicted energy demand, when personnel flow reaches the plurality of communities on a selected day, based on forecasted weather conditions for the plurality of communities for the selected day and on the net personnel flow measurement signal on the selected day; and energy plant control means for controlling the energy plant on the basis of the energy demand plan and the predicted variation.

5. An urban energy system for controlling an energy plant supplying energy to a plurality of communities and an energy supply network connecting the energy plant to the plurality of communities, said system comprising:

energy demand plan making means for predicting in advance an energy demand of the plurality of communities on the basis of past energy demands of the plurality of community and past personnel flow patterns of the plurality of communities, and for making an energy demand plan for the plurality of communities on the basis of the predicted energy demand;

personnel flow measurement means for measuring flow of personnel into and out of the plurality of communities and providing a net personnel flow measurement signal indicative of the net personnel flow;

means for receiving a forecast of weather conditions for the community;

energy demand variation predicting means for predicting a variation in the predicted energy demand, when personnel flow reaches the plurality of communities on a selected day, based on forecasted weather conditions for the plurality of communities for the selected day and on the net personnel flow measurement signal on the selected day; and energy supply network control means for controlling operation of the energy supply network on the basis of the energy demand plan and the predicted variation.

6. An urban energy system according to any one of claims 1 to 5, wherein said energy demand plan making means learns the past energy demands by using year month time data, weather data, and person count data as input items.

7. An urban energy system according to any one of claims 1 to 5, wherein said energy demand variation predicting means predicts a variation based on a number of personnel for use as a reference when the energy demand plan is made, and predicts a new variation based on the measured flow of personnel when the personnel of the personnel flow reach the community.

8. An urban energy system for controlling an energy plant supplying energy to an urban area, having a newly planned community, and an energy supply network connecting the energy plant to the community, said system comprising:

energy demand plan making means for making a first energy demand prediction for the newly planned community based on past energy demands of existing communities, for making a second energy demand prediction for the newly planned community based on a calculated energy demand plan for the newly planned community when the newly planned community is planned, and for making an energy demand plan for the community based on at least one of the first and second predicted thermal energy demands;

personnel flow measurement means for measuring flow of personnel into and out of the community and providing a net personnel flow measurement signal indicative of the net personnel flow;

energy demand variation predicting means for predicting a variation in the made energy demand plan for the community, based on the net personal flow measurement signal; and energy plant control means for controlling the energy plant on the basis of the made energy demand plan and the predicted variation.

9. An urban energy system for controlling an energy plant supplying energy to an urban area, having a newly planned community, and an energy supply network connecting the energy plant and the community, said system comprising:

energy demand plan making means for predicting in advance an energy demand of an existing community based on past energy demands of the existing community, for predicting an energy demand of the newly planned community based on an energy amount plan value for the newly planned community determined when the newly planned community was planned, and for making an energy demand plan for the newly planned community on the basis of at least one of the predicted energy demand of the existing community and the predicted energy demand of the newly planned community;

personnel flow measurement means for measuring flow of personnel into and out of the newly planned community and providing a net personnel flow measurement signal indicative of the net personnel flow;

energy demand variation predicting means for predicting a variation in the predicted energy demand of the newly planned community, based on the net personnel flow measurement signal; and energy supply network control means for controlling operation of the energy supply network on the basis of the energy demand plan and the predicted variation.

10. An urban energy system according to claim 8 or 9, wherein said energy demand variation predicting means includes means for determining a variation between the number of personnel who reach the newly planned community, as indicated by the net personnel flow measurement signal, and a number of personnel used as a reference when the energy demand plan of the newly planned community was made, and for determining the variation of the actual energy demand of the newly planned community from the predicted thermal energy demand of the existing community.

11. An urban energy system for controlling an energy plant supplying energy to a new community and an energy supply network connecting the energy plant and the new community, said system comprising:

energy demand plan making means for predicting an energy demand of the new community on the basis of an energy amount plan value determined when the new community was planned and for making an energy demand plan for the new community on the basis of the predicted energy demand;

personnel flow measurement means for measuring flow of personnel into and out of the new community and providing a net personnel flow measurement signal indicative of the net personnel flow;

means for receiving a forecast of weather conditions for the new community;

energy demand variation predicting means for comparing personnel flow into and out of the new community as indicated by the net personnel flow measurement signal and a personnel flow value used as a reference when the energy demand plan was made to predict a variation in the predicted energy demand;

energy plant control means for controlling the energy plant on the basis of the energy demand plan, forecasted weather conditions for the new community, and the predicted variation.

12. An urban energy system for controlling an energy plant supplying energy to a new community and an energy supply network connecting the energy plant and the new community, said system comprising:

means for receiving a forecast of weather conditions for the new community;

energy demand plan making means for predicting an energy demand of the new community on the basis of an energy amount plan value determined when the new community was planned, and for making an energy demand plan for the new community on the basis of the predicted energy demand;

personnel flow measurement means for measuring flow of personnel into and out of the new community and providing a net personnel flow measurement signal indicative of the net personnel flow;

energy demand variation predicting means for comparing personnel flow into and out of the new community as indicated by the net personnel flow measurement signal and a personnel flow value used as a reference when the energy demand plan was made, to predict a variation in the predicted energy demand; and energy supply network control means for controlling operation of the energy supply network on the basis of the energy demand plan and the predicted variation.

13. An urban energy system for controlling a plurality of energy plants supplying different types of energy to a community and an energy supply network connecting the plurality of energy plants and the community, said system comprising:

energy demand plan making means for predicting in advance an energy demand of the community for each of the types of energy on the basis of past energy demands of the community and past personnel flow patterns of the community and for making an energy demand plan for the community for each of the types of energy on the basis of the predicted energy demands;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand on a selected day, based on forecasted weather conditions for the community for the selected day and on the net personnel flow measurement signal on the selected day; and energy plant control means for controlling the energy plant on the basis of the energy demand plan and the predicted variation.

14. An urban energy system for controlling a plurality of energy plants supplying different types of energy to a community and an energy supply network connecting the plurality of energy plants and the community, said system comprising:

energy demand plan making means for predicting in advance energy demands of the community for each of the types of energy on the basis of past energy demands of the community and past personnel flow patterns of the community and for making an energy demand plan for the community for each of the types of energy on the basis of the predicted energy demands;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand on a selected day, based on forecasted weather conditions for the community for the selected day and on the net personnel flow measurement signal on the selected day; and energy supply network control means for controlling operation of the energy supply network for each of the types of energy on the basis of the energy demand plan and the predicted variations.

15. An urban energy system for controlling an energy plant supplying energy to a community and an energy supply network connecting the energy plant to the community, said system comprising:

a database of past energy demands of the community for previous years, the patterns of personnel flow into and out of the community in the previous years, and forecasted climatic conditions for the community;

energy demand plan making means for predicting in advance an energy demand of the community for each day on the basis of past energy demands of the community and past personnel flow patterns of the community as contained in said database;

personnel flow measurement means for measuring flow of personnel into and out of the community and providing a net personnel flow measurement signal indicative of the net personnel flow;

means for receiving a forecast of weather conditions for the community;

energy demand variation predicting means for predicting a variation in the predicted energy demand on a selected day, based on the forecasted climatic conditions for the community for the selected day as contained in said database and based on the net personnel flow signal on the selected day; and energy control means for controlling the energy plant and the energy supply network on the basis of the predicted energy demand and the predicted variation.

16. An urban energy system for controlling a supply of energy to a community by way of an energy supply network connecting a plurality of energy sources to the community, said system comprising:

energy demand plan making means for predicting in advance an energy demand of the community on the basis of the past energy demands of the community and past personnel flow patterns of the community and for making an energy demand plan for the community on the basis of the predicted energy demand;

personnel flow measurement means for measuring flow of personnel into and out of the community and providing a net personnel flow measurement signal indicative of the net personnel flow;

energy demand variation predicting means for predicting a variation in the predicted energy demand based on the net personnel flow measurement signal;

energy source capability predicting means for predicting whether each of the energy sources is capable of supplying energy to the community as required in accordance with the energy demand plan and the predicted variation, and for providing an energy supply margin index for each of the energy sources; and energy control means for controlling the energy sources and the energy supply network on the basis of the energy supply margin indices.

17. An urban energy system according to claim 16, further comprising output means for outputting an energy supply starting operation amount and an energy supply stopping operation amount for the plurality of energy sources, on the basis of the energy supply margin indices, so as to minimize the cost of operation of energy system.

18. An urban energy system according to claim 16, further comprising vehicular traffic flow detecting means for measuring flow of vehicular traffic into and out of the community and providing a net vehicular traffic flow measurement signal, and wherein said energy demand variation predicting means predicts the variation further based on the net vehicular traffic flow measurement signal.

19. An urban energy system for controlling a supply of energy to a community by way of an energy supply network connecting a plurality of energy sources to the community, said system comprising:

energy demand plan making means for predicting in advance an energy demand of the community on the basis of the past energy demands of the community and past personnel flow patterns of the community and for making an energy demand plan for the community on the basis of the predicted energy demand;

personnel flow measurement means for measuring flow of personnel into and out of the community and providing a net personnel traffic flow measurement signal;

energy demand variation predicting means for predicting a variation in the predicted energy demand based on the net personnel flow measurement signal;

means for receiving an indication of energy demand of the community;

environmental distribution determining means for providing an environmental measured value distribution for the community on the basis of the energy demand plan and the predicted variation;

environmental evaluation determining means for providing an evaluated value distribution for the community on the basis of the indicated energy demand of the community;

means for determining an operation amount for the plurality of energy sources based on the evaluated value distribution and the environmental measured value distribution;

control means for controlling the energy sources and the energy supply network so as to provide energy to the community at the operation amount; and adjusting means for adjusting the determined operation amount on the basis of changes in the environmental measured value distribution during control of the energy sources at the operation amount.

* * * * *